United States Patent [19]
Sharma et al.

[11] Patent Number: 6,046,833
[45] Date of Patent: Apr. 4, 2000

[54] METHOD AND APPARATUS FOR OPERATION, PROTECTION, AND RESTORATION OF HETEROGENEOUS OPTICAL COMMUNICATION NETWORKS

[75] Inventors: Rohit Sharma, Sunnyvale; Larry R. McAdams, Belmont, both of Calif.

[73] Assignee: Optical Networks, Inc., San Jose, Calif.

[21] Appl. No.: 09/020,954

[22] Filed: Feb. 9, 1998

Related U.S. Application Data

[60] Provisional application No. 60/038,149, Feb. 10, 1997.

[51] Int. Cl.$^7$ ............................. H04B 10/20; H04J 14/00
[52] U.S. Cl. ............................ 359/119; 359/110; 359/128
[58] Field of Search ..................................... 359/110, 119, 359/128; 370/222

[56] References Cited

U.S. PATENT DOCUMENTS

| | | | |
|---|---|---|---|
| 5,442,623 | 8/1995 | Wu | 359/110 |
| 5,717,796 | 2/1998 | Clendening | 359/119 |
| 5,745,476 | 4/1998 | Chaudhuri | 370/222 |

OTHER PUBLICATIONS

Arecco, Fulvio et al., "All–Optical Path Protection in the 'Prometeo' Test Bed: An Unidirectional WDM Transparent Self Healing Ring in a Field Environment," IEEE, 1997, pp. 392–393.

Blain, Laurent et al., "Comparison of Classical and WDM Based Ring Architecture," Broadband Superhighway, 1996, pp. 261–268.

Hamel, A. et al., "WDM technique and MS protection in a standard ring: the 'coloured section' ring," Broadband Superhighway, 1996, pp. 255–260.

Hasegawa, Satoshi et al., "Control Algorithms of SONET Integrated Self–Healing Networks," IEEE Journal on Selected Areas in Communications, vol. 12, No. 1, Jan. 1994, pp. 110–118.

Iannone, Eugenio et al., "Optical Path Technologies: A Comparison Among Different Cross–Connect Architectures," IEEE Journal of Lightwave Technology, vol. 14, No. 10, Oct. 1996, pp. 2184–2196.

Sato, Ken–ichi et al., "Network Performance and Integrity Enhancement with Optical Path Layer Technologies," IEEE Journal on Selected Areas in Communications, vol. 12, No. 1, Jan. 1994, pp. 159–170.

Shiragaki, Tatsuya et al., "Optical Digital Cross–Connect System Using Photonic Switch Matrices and Optical Amplifiers," IEEE Journal of Lightwave Technology, vol. 12, No. 8, Aug. 1994, pp. 1490–1496.

(List continued on next page.)

*Primary Examiner*—Kinfe-Michael Negash
*Attorney, Agent, or Firm*—Townsend and Townsend and Crew LLP

[57] ABSTRACT

Techniques for providing normal operation and service restoration capability in the event of failure of terminal equipment or transmission media in a heterogeneous network, such as a hybrid network containing single- and multi-wavelength lightwave communications systems. An optical switching node (OSN) is placed at each node in the ring network to provide the required connections between various fibers and terminal equipment, but having switch states that allow signals on the protection fibers to bypass the terminal equipment at that node. Ring-switched signals propagate around the ring on protection fibers without encountering the terminal equipment at the intervening nodes. To the extent that the protection fiber links between any given pair of nodes are incapable of supporting all the relevant communication regimes, such links are modified to provide such support.

17 Claims, 26 Drawing Sheets

Microfiche Appendix Included
(24 Microfiche, 96 Pages)

OTHER PUBLICATIONS

Slevinsky, J.B. et al., "An Algorithm for Survivable Network Design Employing Multiple Self–healing Rings," IEEE Communications Society Reprint, 1993, pp. 1568–1573.

Tumolillo, Thomas A. et al., "Solid State Optical Space Switches for Network Cross–Connect and Protection Applications," IEEE Communications Magazine, Feb. 1997, pp. 124–130.

Watanabe, Atsushi et al., "Optical Path Cross–Connect System Architecture Suitable for Large Scale Expansion," IEEE Journal of Lightwave Technology, vol. 14, No. 10, Oct. 1996, pp. 2162–2172.

Wu, Tsong–Ho, "A Passive Protected Self–Healing Mesh Network Architecture and Applications," IEEE/ACM Transactions on Networking, vol. 2, No. 1, Feb. 1994, pp. 40–52.

(ii) 6. Span Switch East-In, East-Out (ii) 7. Span Switch West-In, East-Out (ii) 8. Span Switch West-Out, East-In (ii) 9. Span Switch West-In, East-In (ii) 10. Span Switch West-Out, East-Out (ii) 11. Span Switch West-In, West-Out, East-In (ii) 12. Span Switch West-In, West-Out, East-Out (ii) 13. Span Switch East-In, East-Out, West-In (ii) 14. Span Switch East-In, East-Out, West-Out (ii) 15. Span Switch West-In/Out, East-In/Out (iii) 1. Ring Switch West-In (iii) 2. Ring Switch West-Out (iii) 3. Ring Switch East-Out (iii) 4. Ring Switch East-In (iii) 5. Full Ring Switch West (iii) 6. Full Ring Switch East (iii) 7. Ring Switch West-In, East-Out (iii) 8. Ring Switch West-Out, East-In (iii) 9. Ring Switch West-In, Span Switch East-Out (iii) 10. Ring Switch West-In, Span Switch West-Out (iii) 11. Ring Switch West-In, Span Switch East-Out, West-Out (iii) 12. Ring Switch West-Out, Span Switch East-In (iii) 13. Ring Switch West-Out, Span Switch West-In (iii) 14. Ring Switch West-Out, Span Switch East-In, West-In (iii) 15. Ring Switch East-In,
Span Switch East-Out (iii) 16. Ring Switch East-In,
Span Switch West-Out (iii) 17. Ring Switch East-In,
Span Switch East-Out, West-Out (iii) 18. Ring Switch East-Out,
Span Switch East-In (iii) 19. Ring Switch East-Out,
Span Switch West-In (iii) 20. Ring Switch East-Out,
Span Switch East-In, West-In (iv) 1. P-Transit West-to-East (iv) 2. P-Transit West-to-East, Span Switch West-Out (iv) 3. P-Transit West-to-East, Span Switch East-In (iv) 4. P-Transit West-to-East, Span Switch West-Out, East-In (iv) 5. P-Transit East-to-West (iv) 6. P-Transit East-to-West, Span Switch West-In (iv) 7. P-Transit East-to-West,
Span Switch East-Out (iv) 8. P-Transit East-to-West,
Span Switch West-In, East-Out (iv) 9. P-Transit West-to-East
and East-to-West (iv) 10. P-Transit (Amp/Regen) West-to-East (iv) 11. P-Transit (Amp/Regen) West-to-East,
Span Switch West-Out (iv) 12. P-Transit (Amp/Regen) West-to-East,
Span Switch East-In (iv) 13. P-Transit (Amp/Regen) West-to-East, Span Switch West-Out, East-In (iv) 14. P-Transit (Amp/Regen) East-to-West (iv) 15. P-Transit (Amp/Regen) East-to-West, Span Switch West-In (iv) 16. P-Transit (Amp/Regen) East-to-West, Span Switch East-Out (iv) 17. P-Transit (Amp/Regen) East-to-West, Span Switch West-In, East-Out (iv) 18. P-Transit (Amp/Regen) West-to-East and East-To-West The secondary port traffic from the ATM/IP switches is dropped when restoration occurs.

METHOD AND APPARATUS FOR OPERATION, PROTECTION, AND RESTORATION OF HETEROGENEOUS OPTICAL COMMUNICATION NETWORKS

CROSS-REFERENCE TO RELATED APPLICATIONS

This application claims priority from the following U.S. Applications, the disclosures of which, including all attached documents and appendices, are incorporated by reference in their entirety for all purposes:

Application Ser. No. 60/038,149, filed Feb. 10, 1997, of Rohit Sharma and Larry R. McAdams, entitled "METHOD AND APPARATUS FOR SIMULTANEOUS OPERATION OF SINGLE AND MULTIPLE WAVELENGTH LIGHTWAVE COMMUNICATION NETWORKS."

Application Ser. No. 09/019,347 filed Feb. 5, 1998, of Rohit Sharma and Larry R. McAdams, entitled "METHOD AND APPARATUS FOR OPERATION, PROTECTION, AND RESTORATION OF HETEROGENEOUS OPTICAL COMMUNICATION NETWORKS".

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDICES

The following appendices are filed herewith as a part of the application and are incorporated by reference in their entirety for all purposes:

Appendix 1–96 pages of source code on 24 sheets;

Appendix 2–(51 pages on 13 sheets) Span Switch Restoration States (file Restoration_States_Span);

Appendix 3–(62 pages on 16 sheets) Ring Switch Restoration States (file Restoration_States_Ring);

Appendix 4–(58 pages on 15 sheets) P-Transit Switch Restoration States (file Restoration_States_Transit);

Appendix 5–(52 pages) Adjacent Node Action Request Table (file ANAR_Table); and

Appendix 6–(44 pages on 11 sheets) "OSN Operation: SONET and WDM Network Elements."

BACKGROUND OF THE INVENTION

The invention relates generally to optics and communications, and more specifically to optical fiber based networks, techniques for restoration of network services in the event of a failed fiber link (e.g., a break in a fiber or a failure of an active element such as a fiber amplifier) and the use of optical switching to effect such restoration.

Photonic transmission, amplification, and switching techniques provide flexible means of provisioning, configuring, and managing the modern high capacity telecommunication networks. The physical layer in the network, which includes the transmission equipment and the fiber layer used for signal transport, is required to be capable of reconfiguration of facilities in order to support dynamic routing of traffic. While slow reconfiguration of the order of minutes or more may be sufficient for rearranging traffic capacity in response to change in demand patterns across the network, rapid reconfiguration (perhaps 50 ms or less) is required for restoring services in the case of transmission equipment or fiber cable facility failures. Fast restoration is also critical to prevent escalation of the effects of a single point of failure where the affected services (voice and data) attempt to reconnect immediately following the disruption of services and may lead to overloading of facilities adjacent or connected to the point of original failure.

In addition to the critical need for fast restoration, the capacity that needs to be re-routed has increased rapidly with the continuing increase in data rates for optical transmission and the introduction of multi-wavelength channels on a single fiber. For example, the rapid growth in traffic capacities required for long haul telecommunications networks has accelerated the introduction of new technologies for transmission and multiplexing. Transmission links up to bit rates of 10 Gbps (OC-192) are in commercial service and new developments in multi-wavelength component technologies are resulting in increased commercial availability of 4-, 8-, 16-, 32-, and 40-channel WDM (wavelength division multiplex) links (at 2.5 Gbps per wavelength or more).

Transmission of such high data rates over single fibers also results in making the network more vulnerable to failures of larger magnitude. For example, a single fiber link failure can disrupt approximately 130,000 voice channels (DS0) when the fiber link is operating at 10 Gbps on a single-wavelength or at 2.5 Gbps on each of four wavelengths. Consequently, redundant facilities provisioned for dynamic restoration of service also need to provide a similar magnitude of capacity on the links used as backup or spare links for ensuring network survivability.

Therefore, routing techniques used for network restoration must provide solutions that are compatible with the twofold requirement of fast switching and high capacity.

International and North American standard bodies have defined various Synchronous Optical Network (SONET) configurations for operation of lightwave networks. "Self-healing ring" configurations allow for rapid restoration of services in the event of a failure of fiber transmission media. In a four-fiber self-healing ring network, each node is connected to its adjacent nodes through two pairs of fibers (carrying signals in opposite directions). One fiber in each such pair is called the "working" fiber; the other fiber is termed the "protection" fiber and may be used when the working fiber facility fails. Each node includes add-drop multiplexer (ADM) terminal equipment that originates and terminates signals traversing the various links in the ring.

When a failure of any working fiber link between any two nodes occurs, the ADM terminal equipment on either side of the failure carries out the required re-routing of signals over protection fibers. Such re-routing of signals to restore all services is referred to as "restoration" of services. If an outgoing working fiber link fails, but the corresponding protection fiber link is intact, the signals intended for the failed working fiber will be diverted to the intact corresponding protection fiber in what is referred to as span switching. In this context, reference to the corresponding protection fiber means the protection fiber coupled between the same two nodes and for use in the same direction (to or from the other node).

If the working and protection links fail, the signals intended for the failed working fiber will be directed to the outgoing protection fiber in the other direction around the ring, being passed from one node to the next, in what is referred to as ring switching.

However, some of these restoration schemes (ring switching) break down in what will be referred to as heterogeneous networks. A heterogeneous ring network is one where different links differ in some material respect such as signal-carrying capacity (bandwidth), number of wavelength channels, modulation scheme, format, or protocol. For example, certain high-traffic links may have been upgraded to provide increased bandwidth, by increasing the bit rate of signals on a given wavelength channel, by providing additional WDM terminal equipment to support additional wavelength channels, or both.

Thus, for a variety of reasons, the network may have a link, with terminal equipment at each end, where the signals on that link are alien or unsupported on one or more other links. Since at least some link in the opposite direction will not support the signals that normally travel on the failed link, ring switching is not possible. A particular type of heterogeneous network, namely one containing single- and multi-wavelength lightwave communication links, is sometimes referred to as a hybrid network.

SUMMARY OF THE INVENTION

The present invention provides methods and apparatus for providing normal operation and service restoration capability in the event of failure of terminal equipment or transmission media in a heterogeneous network, such as a hybrid network containing single- and multi-wavelength lightwave communications systems.

In general, this is accomplished by allowing ring-switched signals to propagate around the ring without encountering the terminal equipment at the intervening nodes. To the extent that the protection fiber links between any given pair of nodes are incapable of supporting all the relevant communication regimes, such links are modified to provide such support.

In specific embodiments, an optical switching node (OSN) is placed at each node in the ring network to provide the required connections between various fibers and terminal equipment, but having switch states that allow signals on the protection fibers to bypass the terminal equipment at that node. In the context of a hybrid network where only some nodes have WDM terminal equipment, normal operation and restoration of multi-wavelength signals become possible without disturbing the single-wavelength SONET operation of that ring.

The steps, if needed, to upgrade the protection links depend on the nature of the network heterogeneity, but are generally relatively inexpensive. For example, upgrading the protection links to support multi-wavelength or higher bit-rate operation often entails no more than the addition of appropriate optical amplifiers. Routing or re-routing for restoration of the high-bandwidth (e.g., multi-wavelength) traffic takes place through the OSNs. It is not necessary to provide special terminal equipment capable of terminating the high-bandwidth signals at the nodes that are not normally required to handle such signals, since those nodes are bypassed due to the operation of the OSNs.

A further understanding of the nature and advantages of the present invention may be realized by reference to the remaining portions of the specification and the drawings.

DESCRIPTION OF SPECIFIC EMBODIMENTS

1.0 Technological Overview

1.1 Network Layers

Figure 1A:
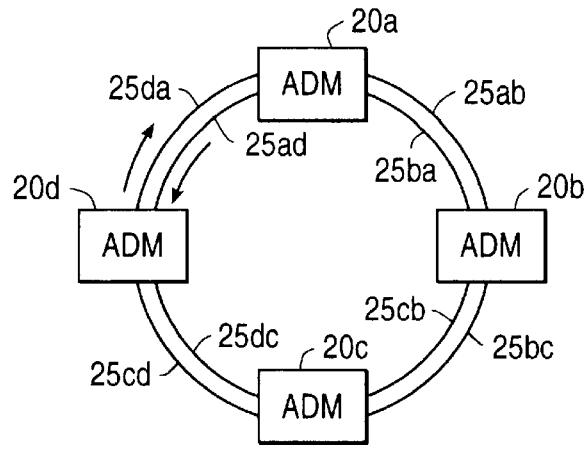
FIGS. 1A and 1B show typical prior art ring and mesh network opologies.

Discussions of network communications are often with reference to a network layer model, such as the International Standards Organization (ISO) Open Systems Interconnection (OSI) reference model. The OSI layers, from the highest to the lowest, include the application layer, the presentation layer, the session layer, the transport layer, the network layer, the data link layer, and the physical layer.

The application layer supports semantic exchanges between applications and provides access to the lower functions and services. The presentation layer deals with representing data to the end user or application. The session layer organizes and structures the interaction between applications and devices. The transport layer is responsible for transparent and reliable transfer of data without regard to the nature and attributes of the transfer medium. The network layer establishes communication between networks and is concerned with addressing, routing, and relaying information. The data link layer provides functions and protocols for transferring data between network resources and detecting errors in the physical layer. The physical layer, in addition to defining the actual mechanical, electrical, or optical characteristics of the communication medium, also defines the functional and procedural standards for the physical transmission of data over the communications medium.

The physical layer is itself often considered to include a number of sublayers including, from top to bottom, the line terminal equipment (LTE) layer, the photonic connectivity layer, and the fiber infrastructure.

1.2 Fiber Technologies

Optical fiber links used in telecommunications are either single-wavelength or multi-wavelength. In a fiberoptic communications network, an electrical signal is converted to an optical signal, typically by modulating a laser diode emitting light at a wavelength suited for propagation along the fiber. The modulated light is injected into the fiber and detected by a fiberoptic receiver that includes a photodiode or other opto-electronic device to retrieve a signal corresponding to the original electrical signal. It is possible to transmit many signals on an optical fiber at the same time using a technique known as wavelength division multiplexing (WDM). Light at a number of different wavelengths is injected into a single fiber using a wavelength multiplexer, and the light at the individual wavelengths are separated at the other end using a wavelength demultiplexer.

Wavelength multiplexers and demultiplexers are often referred to generically as WDM couplers. It is also possible to use WDM couplers to establish bidirectional operation on a single fiber, and WDM couplers optimized for such use are often referred to as bidirectional WDM couplers. Some other optical elements such as isolators and circulators are often used in conjunction with WDM couplers to establish bi-directional communications over a single fiber with reduced cross-talk, back-reflection, etc. Although these elements are not essential in theory, they are useful in practice.

A given optical fiber that supports transmission at a given wavelength is likely to support transmission at a number of closely spaced wavelengths. However, it is typically the case that optical amplifiers are disposed at various locations in the path, say every 30 km, and a typical single-wavelength fiber link is likely to have amplifiers that only operate correctly for the single wavelength that is being transmitted on the fiber. A different optical amplifier may be needed to support multi-wavelength operation.

Prior to the development of erbium-doped fiber amplifiers, it was necessary to interpose regenerators (sometimes referred to as repeaters) in order to maintain the signal. A regenerator would convert the optical signal to an electrical signal, amplify the electric signal, and then reconvert the amplified electric signal to an optical signal. The regenerator may also reshape or otherwise condition the electrical signal and resynchronize the electrical signal to a master network clock (if available) before reconverting it to an optical signal. Common wavelengths for use in fiberoptic transmission include wavelengths in the neighborhoods of 1310 nm and 1550 nm. However, the erbium amplifiers operate only in the 1550-nm range, and so as a practical matter, 1550 nm remains the wavelength of choice. In a typical multi-wavelength environment, the wavelengths are spaced by 0.8 nm (corresponding to 100 GHz at 1550 nm) or 1.6 nm, and are typically in the range of 1530–1570 nm. It is noted that a regenerator for multi-wavelength fiber would require that each wavelength be separately regenerated, thus requiring a WDM demultiplexer for sending each wavelength on the incoming fiber to a separate regenerator and a WDM multiplexer to recombine the regenerated optical signals onto the outgoing fiber.

There are two classes of optical fiber, referred to as single-mode and multi-mode. While multi-mode fiber is relatively inexpensive, it is typically used only for short data communications applications (say 50 meters or less). This is because the different modes of propagation have different transit times along the fiber, so dispersion becomes a significant factor over long distances.

1.3 SONET Restoration

In the discussion that follows, the specific type of network is a synchronous optical network (SONET), which uses time division multiplexing (TDM) wherein multiple channels are given different time slots within a frame. Each node includes an add-drop multiplexer (ADM) that interfaces the fibers to the electronic devices that are to communicate with each other over the network. A SONET network provides reliable transport from point to point and has the capability of providing restoration. However, the invention finds applicability with other types of terminal equipment, such as devices for routing ATM, IP, or other types of packet or synchronous data.

The SONET ADM provides two broad functions. The first function is extracting information in one of the time slots from the incoming working fibers and outputting information into that time slot for transmission (along with the information in the other time slots) on the fiber that continues in the same direction. The second function is performing electrical switching to reroute information onto the protection fibers in the event of a failure in one or more of the fiber links. In this application, the term "link" will be used to refer to a communication path between two nodes. The term "span" is sometimes used to refer the same thing.

FIG. 1A shows a typical prior art ring network topology. FIG. 1A shows a ring network in which a plurality of nodes 20 are interconnected by fibers 25. FIG. 1A shows a bidirectional ring wherein each node can send and receive signals to and from adjacent nodes on the ring. The nodes are designated 20a, 20b, 20c, etc., and are denoted as having ADMs. The nomenclature regarding the fibers is that a fiber for propagating signals from a given node to an adjacent node is provided with the suffix comprising the letter suffix of the originating node and the receiving node. For example, node 20a sends signals to node 20b on fiber 25ab and receives signals from node 20b on fiber 25ba.

While from the point of view of the ring, the directions are referred to as clockwise and counterclockwise, from a node's point of view, the two directions are arbitrarily designated upstream and downstream, or west and east.

Figure 1B:
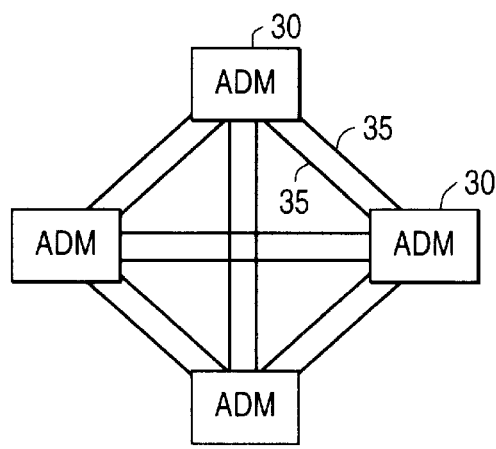

FIG. 1B shows a typical prior art mesh network wherein a plurality of nodes 30 send and receive signals to and from other nodes in the network via fibers 35. In this case, at least some nodes are capable of sending and receiving signals directly to and from more than a pair of adjacent nodes. In the particular example shown, there are four nodes in the network, and each has a direct connection to the other three nodes.

Figure 2A:
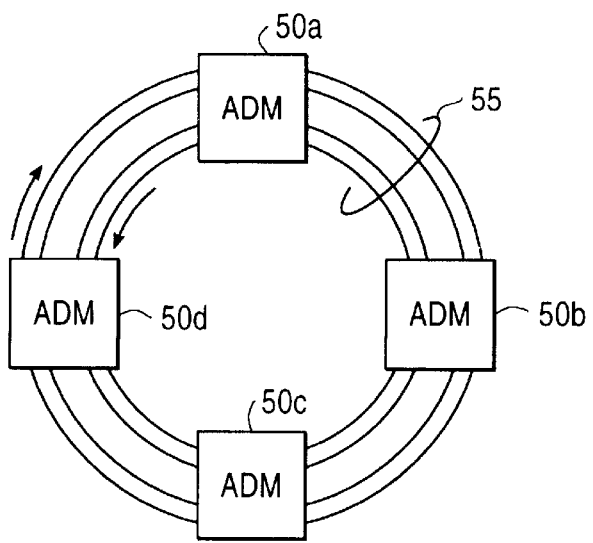
FIG. 2A is a schematic of a prior art four-fiber bidirectional ine switch ring (BLSR)

FIG. 2A is a schematic of a prior art four-fiber bidirectional line switch ring (BLSR). FIG. 2A differs from FIG. 1A in that each fiber in FIG. 1A has a counterpart in FIG. 2A of a pair of fibers, called the working and protection fibers. The ADMs are designated 50a, 50b, 50c, and 50d, and the four-fiber links between adjacent nodes are designated 55.

Figure 2B:
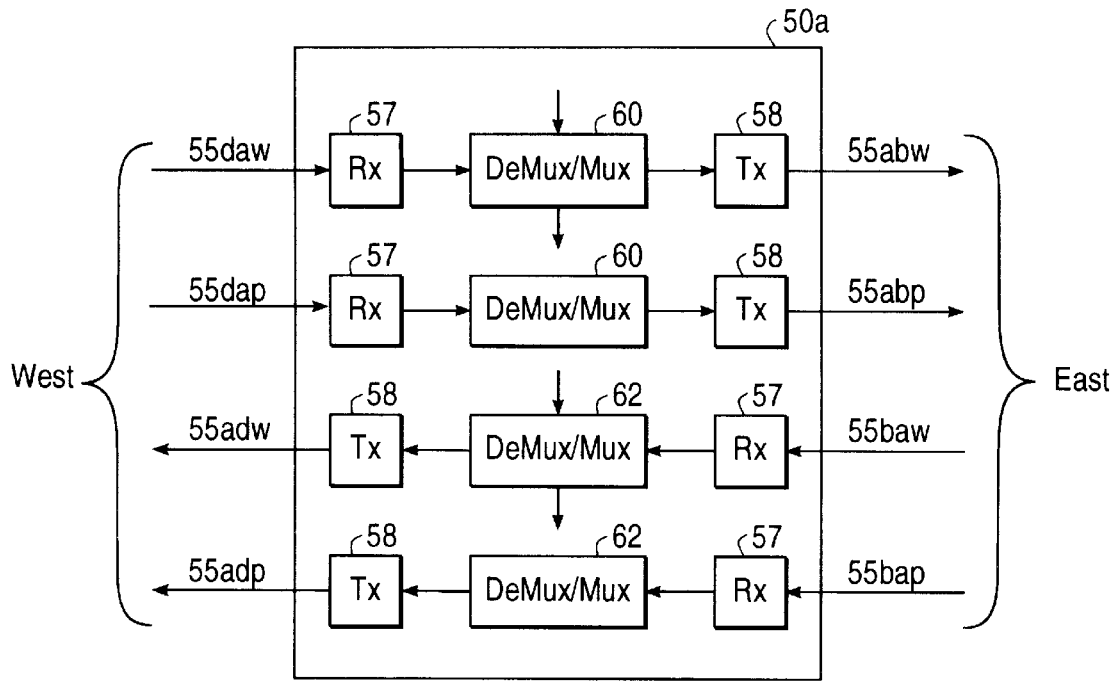
FIG. 2B is a detail view of an add-drop multiplexer (ADM) at ne of the nodes.

FIG. 2B shows additional details of one of the ADMs, say ADM 50a. It is convenient to designate each fiber in the network according to an expanded version of the numbering scheme from FIG. 1A, where each fiber has a further suffix w or p designating whether it was a working fiber or a protection fiber. The ADM has 8 fiber ports, two input from each of two directions and two output towards each of those two directions, designated west and east. Each fiber pair as noted above includes a working and protection fiber. Each input port communicates with an optical receiver 57 that converts the modulated optical signal to a corresponding electrical signal. Each output port communicates with an optical transmitter 58 that converts the electrical signal to a corresponding optical signal.

ADM 50a includes west-to-east demultiplex-multiplex units 60 and east-to-west demultiplex-multiplex units 62. The demultiplex portion of each demultiplex-multiplex unit separates the incoming signals in the different time slots and conditions them; the multiplex portion of each demultiplex-multiplex unit places (combines) the individual conditioned signals into their respective time slots for retransmission. The demultiplex-multiplex units associated with the working fiber ports remove data intended for that node (shown schematically as an arrow pointing downwardly away from the unit) from one or more of the time slots and insert data intended for the next node (shown as an arrow pointing downwardly into the unit) into one or more of the now vacant time slots.

The demultiplex-multiplex units associated with the protection fiber ports need not provide this add-drop functionality, although typical implementations provide the add-drop functionality for all the demultiplex-multiplex units in order to provide the maximum versatility.

ADM 50a further includes provision for electrical switching so that each demultiplex-multiplex unit can receive its data from any of the receivers and output its data to any of the transmitters. ADM 50a also includes provision to pass signals from a protection receiver to the corresponding protection transmitter without change.

Figure 3A:
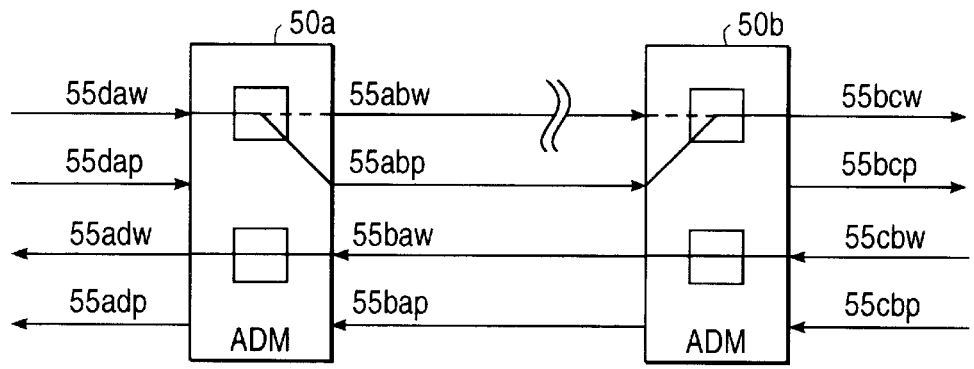
FIG. 3A shows span restoration in a SONET ring.

FIG. 3A shows what is referred to as span restoration (or span switching). This is when a working fiber breaks or some other equipment (e.g., an amplifier) on the working link fails. In the specific example, ADMs 50a and 50b are connected by working and protection fibers 55abw and 55abp for communications from ADM 50a to ADM 50b, and further by working and protection fibers 55baw and 55bap for communications from ADM 50b to 50a. In the specific example, the link defined by working fiber 55abw has failed, making normal communications from ADM 50a to 50b impossible. The drawing is simplified in that the fiber port transmitters and receivers and some of the demultiplex-multiplex units are not shown.

SONET restoration provides for electrically switching the signals that would otherwise have been directed to the transmitter for working fiber 55abw so that they are directed to the transmitter for protection fiber 55abp. Furthermore, the electrical switching at ADM 50b recognizes that the signals otherwise expected to be received from the receiver for working fiber 55abw are instead to be obtained from the receiver for protection fiber 55abp, and performs appropriate routing so that the signals that are to be transferred to ADM 50c (not shown) are communicated to the transmitter for working fiber 55bcw.

Figure 3B:
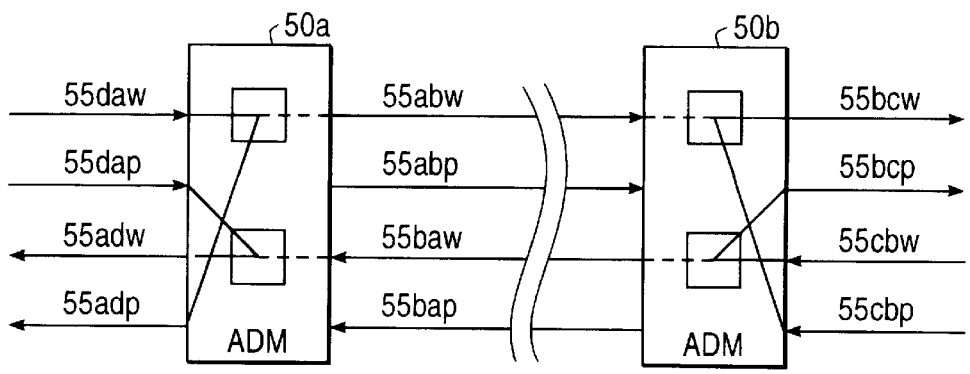
FIG. 3B shows ring restoration in a SONET ring.

FIG. 3B shows what is referred to as ring restoration (or ring switching), which is required when a working fiber link and its corresponding protection fiber link fail (the figure shows the more extreme case where both working fibers and both protection fibers fail). In this case, signals that were to be communicated from ADM 50a to ADM 50b on working fiber 55abw are directed to be output in the opposite direction on protection fiber 55adp. The other ADMs in the ring, except for ADM 50b, receive the incoming data on the protection fiber and forward it to the next node unchanged. Thus, the signals that were otherwise to be received by ADM 50b on working fiber 55abw are received on protection fiber 55cbp.

Similarly, the signals that were intended to be sent from ADM 50b to ADM 50a on working fiber 55baw are rerouted to protection fiber 55bcp and propagate around the ring in the opposite direction, being received by ADM 50a on protection fiber 55dap.

It is assumed in the above discussion that all of the fiber links are single-wavelength. The scheme could be implemented with all the fiber links being multi-wavelength if every node had WDM equipment for multiplexing and demultiplexing the individual wavelengths and if the SONET electrical terminal equipment (ADMs) were replicated for each wavelength.

Figure 4:
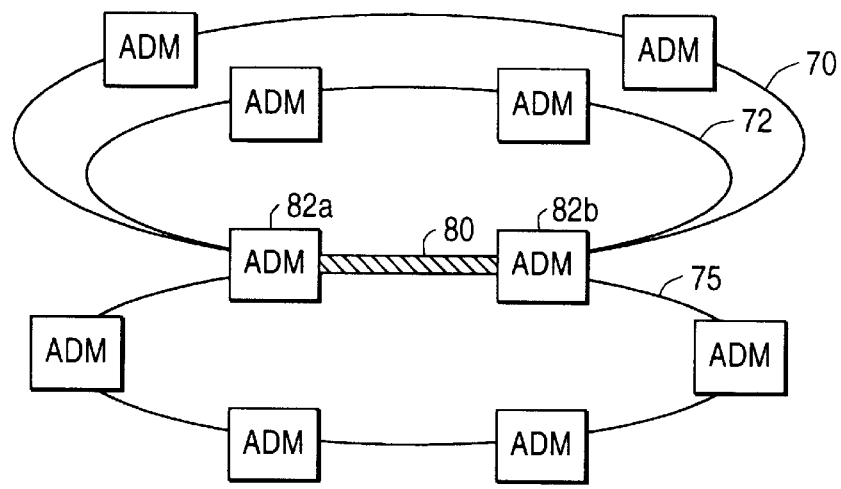
FIG. 4 shows a typical hybrid configuration with a number of single-wavelength rings sharing a multi-wavelength link.

FIG. 4 shows what is referred to as a hybrid network with a plurality of single-wavelength four-fiber BLSRs 70, 72, and 75, but having a shared multi-wavelength link 80 between a pair of nodes 82a and 82b that are common to the three rings. It is possible to implement this since the multi-wavelength link can provide transmission capacity equal to a plurality of single-wavelength links between the nodes. Conceptually, multi-wavelength link 80 can just be considered (in the particular example) as performing the function of 3 single-wavelength links, each dedicated to its particular ring. However, for the example shown, the original reason for outfitting link 80 to a multi-wavelength configuration is that the traffic between nodes 82a and 82b may be exceptionally heavy, and the larger number of wavelengths may be supported on that link.

In the event of a failure in multi-wavelength link 80, communications between ADM 82a and ADM 82b can be restored if there are enough single-wavelength rings, such as rings 70, 72, and 75 whose protection fibers could be used to reroute each wavelength channel on a separate ring as discussed above. To the extent that the number of different wavelengths on link 80 exceeds the number of protection rings, network services between ADMs 82a and 82b will be severely disrupted.

As a matter of terminology, restoration and protection are different, but the term restoration is typically used generically to refer to both. Protection refers to the fact that resources have been committed to carrying the data (e.g., dedicated alternate paths or bandwidth and a mechanism for switching). Restoration, when used in the specific sense, refers to the ability to actively search for capacity in event of a failure, which is relevant in mesh networks. It may be necessary to slow down or disrupt other communication to find the extra path.

1.4 Optical Switching

Figure 5:
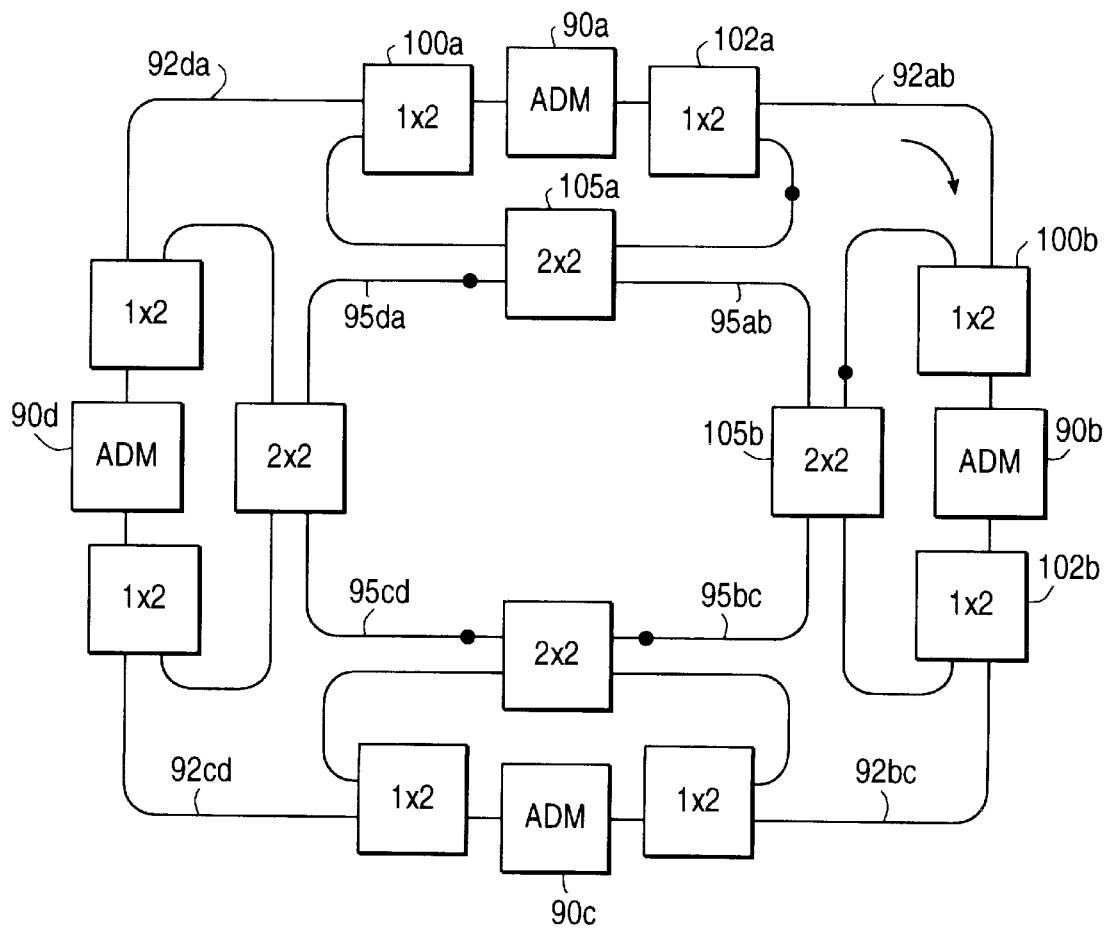
FIG. 5 shows a prior art restoration scheme using optical witches.

FIG. 5 shows a prior art configuration using optical switching for restoration. The figure shows four ADMs 90a–90d and working and protection rings. The working ring includes fiber links 92ab, 92bc, 92cd, and 92da; the protection ring includes protection fiber links 95ad, 95bc, 95cd, and 95da. The figure only shows one-half of the network. In a bidirectional network, additional working and protection fiber rings would be present, and additional switches would be provided.

Each ADM has associated optical switches under control of the ADMs. For example, ADM 90a has 1×2 switches 100a and 102a and a 2×2 switch 105a, and ADM 90b has 1×2 switches 100b and 102b and a 2×2 switch 105b.

The 1×2 optical switches have what are referred to as primary and secondary states. The 2×2 optical switches have what are referred to as cross and bar states. In the network's normal mode of operation, the 1×2 switches are set to their primary states so that the working ring is coupled to the ADMs in the normal way. For restoration, as for example dealing with a break in the working ring between ADMs 90a and 90b, switch 102a would be switched to its secondary state divert light that would otherwise be directed to working link 92ab to 2×2 switch 105 and onto the protection ring.

Assuming a failure in working link 92ab, 1×2 switch 102 would be set to its secondary state so as to divert the light, which would normally be sent on link 92ab, to 2×2 switch 105a, which would be set to its cross-state to divert the light onto protection link 95da. The remaining 2×2 switches would be set to their bar states in order to pass the light to ADM 90b's associated 2×2 switch 105b, which would be set to its cross-state in order to communicate the light to ADM 90b through 1×2 switch 100b, which would be set to its secondary state. The fiber links traversed by the light are marked with large black dots.

2.0 Network Retrofitting and Optical Switching Node (OSN) Overview 2.1 Retrofit

Figure 6:
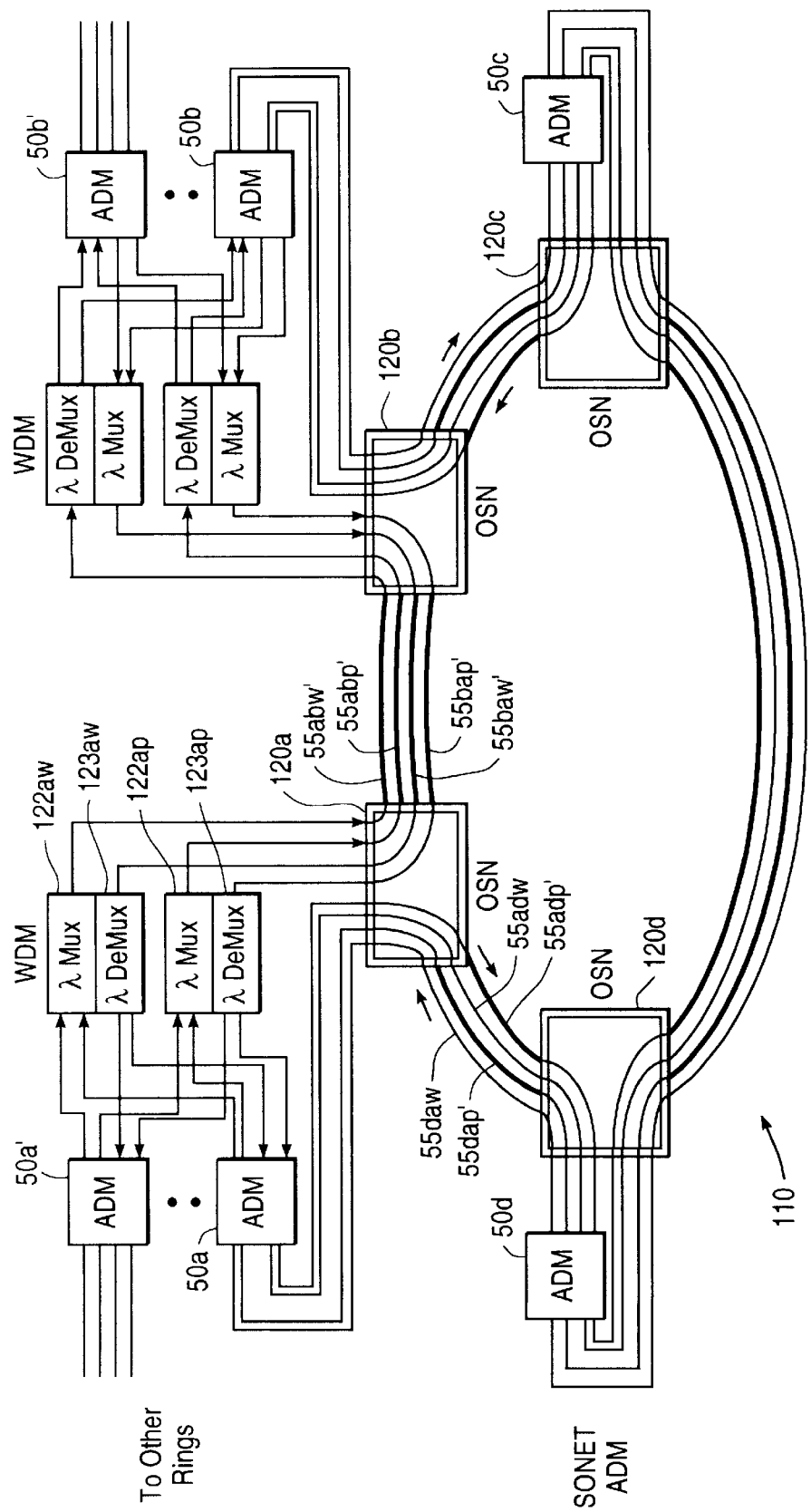
FIG. 6 is a schematic of a four-fiber hybrid BLSR as upgraded according to an embodiment of the invention.

FIG. 6 shows how a hybrid ring network 110 can be retrofitted and upgraded to support multi-wavelength restoration. For ease of description, the network configuration and fiber nomenclature of FIGS. 2A and 2B are used with corresponding elements having the same reference numbers. Primed reference numbers are used to designate multi-wavelength capability, and fibers that are multi-wavelength capable are drawn in heavy lines. In the particular example, a representative ring network having ADMs 50a, 50b, 50c, and 50d has been upgraded so that working fibers 55abw' and 55baw' and protection fibers 55abp' and 55bap', are multi-wavelength capable for bidirectional multi-wavelength communications on the link between ADM 50a and 50b. Thus this ring can share this link with other rings, as indicated in the figure.

While the figure is drawn with separate unidirectional fibers for each bidirectional working link and for each bidirectional protection link, the invention can be implemented in an environment where one or more of the bidirectional links consists of a single fiber carrying signals at one set of wavelengths in one direction and signals at a different set of wavelengths in the other direction. This would require WDM equipment at each end to separate the optical paths for the two sets of wavelengths. It is also possible to implement the invention in an environment where the working and protection capacity (shown as separate working and protection fibers) is provided on a single fiber having a sufficient number of wavelength channels to replicate the necessary bandwidth.

According to embodiments of the present invention, such restorability is provided by the interposition of optical switching nodes (OSNs) 120a, 120b, 120c, and 120d between the ADMs and the fiber rings, and further by retrofitting the protection fibers in the other links so that they are multi-wavelength capable. For example, the protection fibers in the link between OSN 120a and OSN 120d, designated 55adp' and 55dap', are multi-wavelength capable. As noted above, the single-wavelength protection fibers are generally capable of supporting multi-wavelength operation, but it may be necessary to change the amplifiers, if present in the link, to amplifiers having a wider gain band to support multi-wavelength operation.

Each OSN includes optical switch elements and control electronics for controlling the optical switch elements. In a specific embodiment, the control electronics is also responsible for determining when any of the optical links from the network has failed, and communicating messages to the OSNs in the adjacent nodes, as will be described in detail below. For the initial discussions, the OSN will be shown with a view to describing the optical paths. The figure shows the OSNs in their default (normal) state where they act as direct connections between the network and the ADMs. A detailed description of the OSN control electronics will be set forth in a later section.

As a matter of nomenclature, the term "node" is used in two contexts. First is in connection with the network topology, where the term node is used to signify a site where network transmissions may be initiated or terminated. Second is in connection with the optical switching node, which is a separate device that is placed at each node between the terminal equipment and the network fiber links. This should be clear from the context in which the term is used.

FIG. 6 also shows WDM couplers (multiplexers and demultiplexers) and additional ADMs in association with each of OSNs 120a and 120b. In particular, optical signals between ADMs 50a and 50d and optical signals between ADMs 50b and 50c do not encounter WDM equipment while optical signals between ADMs 50a and 50b are optically multiplexed or demultiplexed in connection with the other ADMs. For example, signals to be sent from ADM 50a onto working and protection fibers 55abp' and 55abw' are optically multiplexed (combined) with signals from one or more other ADMs 50a' by working and protection wavelength multiplexers 122aw and 122ap. Similarly, signals for ADM 50a coming in on working and protection fibers 55baw' and 55bap' are optically demultiplexed (split off) from multi-wavelength signals on those fibers by working and protection wavelength demultiplexers 123aw and 123ap. Similar WDM equipment is shown in association with ADM 50b and one or more other ADMs 50b'.

As a matter of terminology, "WDM terminal equipment" refers generally to WDM couplers and the like, while a "WDM terminal" typically refers to a particular combination of WDM terminal equipment for multiplexing and demultiplexing a particular set of fibers. In FIG. 6, working wavelength multiplexer 122aw and working wavelength demultiplexer 123aw constitute a WDM terminal, while protection wavelength multiplexer 122ap and protection wavelength demultiplexer 123ap constitute another WDM terminal. WDM terminals typically include optical amplifiers and transponders (optical-electrical-optical signal conversion units) for each wavelength channel in addition to the multiplexer and demultiplexer.

As noted above in connection with the discussion of FIG. 4, even though the terminal equipment at either end of the multi-wavelength link is multi-wavelength capable (i.e., has WDM terminal equipment and appropriately replicated SONET ADMs), the SONET ring is not capable of restoring multi-wavelength operation in the case of a failure in the multi-wavelength link. Rather, it is the OSNs, deployed and configured according to embodiments of the invention, that provide such restoration capability.

It should be noted that the invention is not limited to hybrid ring networks such as the one illustrated in FIG. 6. In FIG. 6, at least one of the links carries multi-wavelength traffic and is terminated at both ends by WDM-equipped nodes; other links in the network carry single-wavelength traffic, and are terminated by nodes that are incapable of terminating multi-wavelength traffic. As mentioned above, such a hybrid network is one example of a broader class of heterogeneous networks where the communication regimes on some links differ in a material characteristic such as signal-carrying capacity (bandwidth), number of wavelength channels, modulation scheme, format, or protocol. Thus a heterogeneous network is characterized by a link, with terminal equipment at each end, where the signals on that link are incapable of being transmitted on one or more other links, or are incapable of being terminated by terminal equipment on one or more other links, or both.

The techniques of the present invention are in fact applicable to many types of heterogeneous ring networks. For example, different links could differ in bandwidth due to different numbers of wavelengths supported by WDM terminal equipment at different nodes, even if all the links are capable of supporting more than a single wavelength. Similarly, different links could differ in the bit rate or other electrical characteristics of the signals on a particular wavelength channel, even if the different links had the same number of wavelength channels.

The considerations for upgrading the protection links in the more general case are similar to the notion in the specific example of FIG. 6 of upgrading single-wavelength links to support multi-wavelength traffic by providing optical amplifiers with a wider gain band. For example, protection links that normally carry traffic at a bit rate per wavelength channel that is lower than the highest bit rate in the network might have to be upgraded by providing optical amplifiers with higher gain or providing additional optical amplifiers to support traffic at a higher bit rate per wavelength channel. In some instances, it may be necessary to upgrade different protection links in different ways so that all of the protection links can carry the traffic that is normally carried on all other working links. As will be discussed below, the invention does not require that the terminal equipment be upgraded to accommodate the "foreign" traffic. This is because the OSN has a switching state that allows traffic on the protection fibers to bypass the terminal equipment at the associated node.

2.2 OSN Overview 2.2.1 OSN Network Connections and Port Nomenclature

Figure 7A:
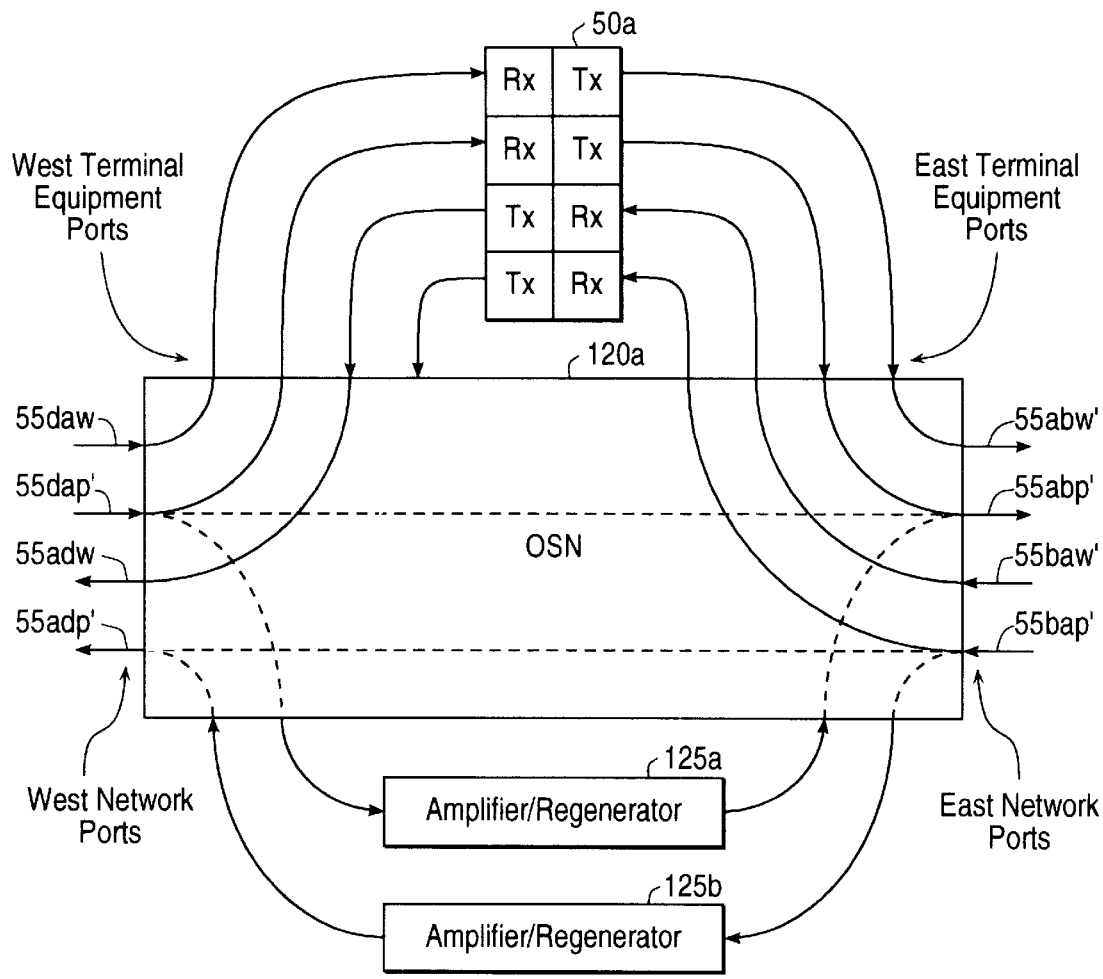
FIG. 7A and 7B are schematic views of an optical switching node (OSN) according to an embodiment of the invention.

FIG. 7A is a schematic view showing additional details of OSN 120a. ADM 50a' is shown generally in the manner that ADM 50a is shown in FIG. 2B. The OSN includes west and east network ports, and west and east terminal equipment ports. The figure shows the normal or default switching configuration where no restoration is being undertaken. In this configuration, the OSN acts as a pass-through between the west network ports and the west terminal equipment ports, and between the east network ports and the east terminal equipment ports. This is only one of the many switching configurations for OSN 120a, as will be described in detail below. The solid lines indicate these default connections.

Given that the right-hand (east) side of this particular ADM is connected to a multi-wavelength link, the connection to the east side of ADM 50a would be through WDM equipment as shown in FIG. 6. For clarity, the WDM equipment shown in FIG. 6 is omitted from FIG. 7A. As an alternative view, each of the right-hand blocks designated Rx could be thought of conceptually as including a WDM demultiplexer and multiple opto-electronic receivers (e.g., photodiodes), each coupled to respective associated SONET ADM circuitry. Similarly, each right-hand block designated Tx could be thought of conceptually as including a WDM multiplexer and multiple electro-optic transmitters (e.g., laser diodes), each coupled to respective associated SONET ADM circuitry. In the particular example shown, the left-hand (west) side of ADM 50a would not have associated WDM equipment.

As will be discussed below, during restoration due to failure of a multi-wavelength link, most of the OSNs in the ring have to provide a bypass path for the multi-wavelength protection fibers. This is shown in dashed straight lines passing from one side of the OSN to the other. It is generally preferred to operate the OSN in connection with signal amplifiers (or regenerators) 125a and 125b, one for each of the protection fiber bypass paths. To this end, the OSN further includes amplifier/regenerator ports for such connections. Regeneration will typically be required if the nodes are separated by more than about 600 km. The connections to the amplifiers (or regenerators) are shown as curved dashed lines that cause the amplifier (or regenerator) to be part of the bypass path. Note that in this bypass path, the protection fiber is not in optical communication with the ADM.

Figure 7B:
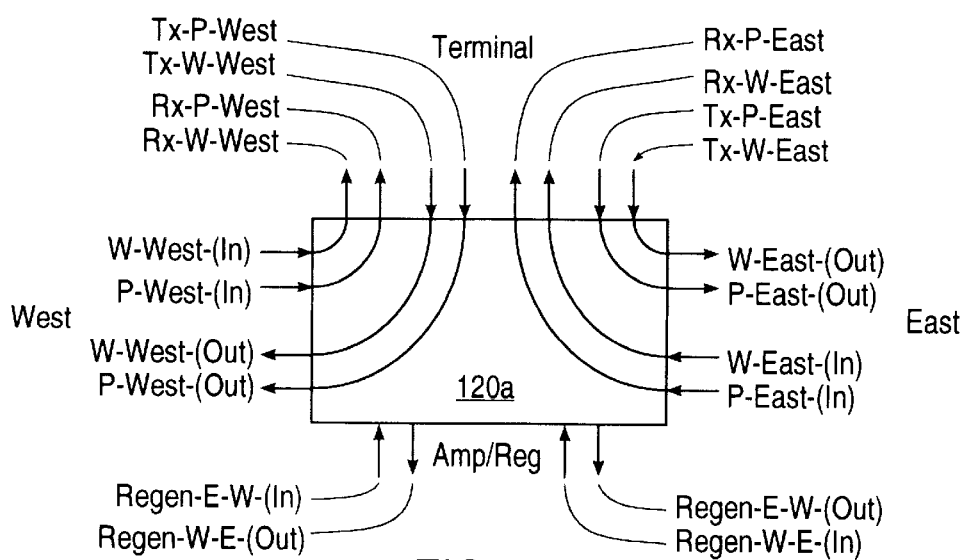

FIG. 7B is a schematic view of OSN 120a showing an alternative nomenclature for the OSN's network ports, terminal equipment ports, and amplifier/regenerator ports. The ports are shown as short arrows indicating an input port or an output port (from the point of view of the OSN). FIG. 7B shows the ports in the same order and relationship to the network and terminal equipment as FIG. 7B.

The OSN's input ports are designated as follows. Tx-W-West and Tx-W-East designate the working terminal ports coupled to the transmitters for the west and east sides, while Tx-P-West and Tx-P-East designate the protection terminal ports coupled to the transmitters for the west and east sides. Similarly, W-West-(In) and W-East-(In) designate the working network ports for the west and east sides, while P-West-(In) and P-East(In) designates the protection network ports for the west and east sides. In a like manner, Regen-W-E-(In) and Regen-E-W-(In) designate the multi-wavelength signal ports coupled to the outputs of regeneration (or amplification) equipment for signals traveling west to east and east to west.

The OSN's output ports are similarly designated. Rx-W-West and Rx-W-East designate the working terminal ports coupled to the receivers for the west and east sides, while Rx-P-West and Rx-P-East designate the protection terminal ports coupled to the receivers for the west and east sides. Similarly, W-West-(Out) and W-East-(Out) designate the working network ports for the west and east sides, while P-West-(Out) and P-East(Out) designates the protection network port for the west and east sides.

In a like manner, Regen-W-E-(Out) and Regen-E-W-(Out) designate the multi-wavelength signal ports coupled to the inputs of regeneration (or amplification) equipment for signals traveling west to east and east to west.

2.2.2 OSN Switch Connections

Figure 8A:
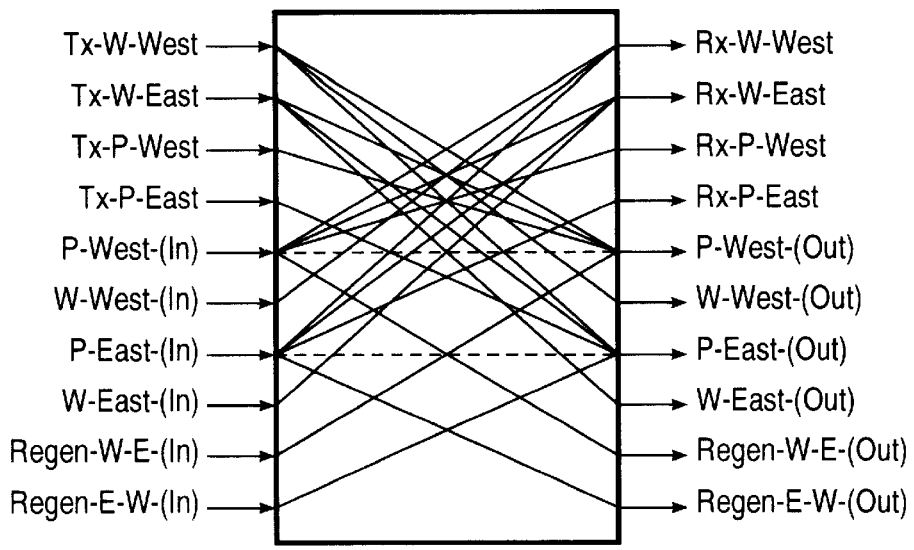
FIGS. 8A and 8B are schematic views showing a number of possible switching paths within the OSN.
Figure 8B:
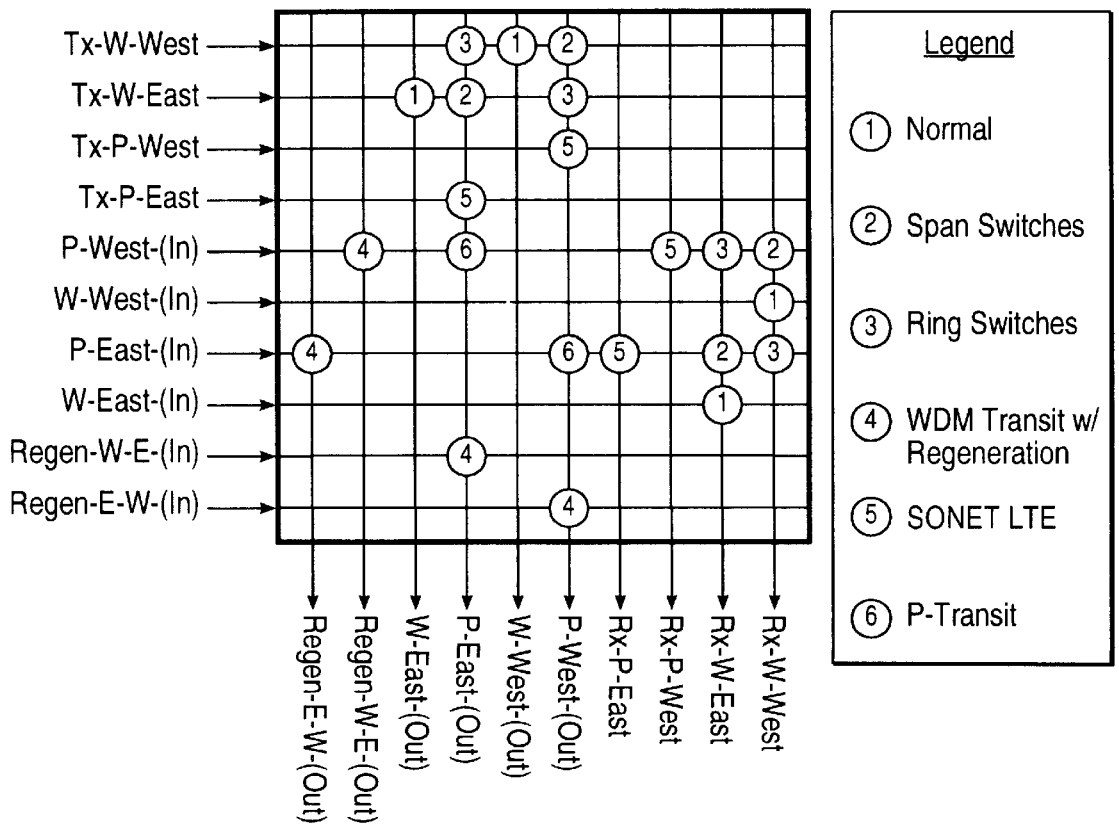

FIGS. 8A and 8B are schematic views showing a number of possible switching paths within the OSN. FIG. 8A is drawn as an interconnection map between the inputs and the output ports of the OSN. Any number of these connections may be made exclusively or simultaneously in order to provide the required operation of the optical switching node. The port nomenclature is as described above in connection with FIG. 7B, but the ports are grouped by input and output ports.

FIG. 8B is drawn as a crosspoint matrix (grid) showing the circumstances under which different switch positions might be required. The OSN is a sparse cross-bar in the sense that only a small fraction of the grid positions are populated (22 out of 100).

3.0 OSN Details and Operation 3.1 OSN Switch States 3.1.1 Overview of OSN States The following sequence of figures, including FIGS. 9A–9O, FIGS. 10A–10T, and FIGS. 11A–11R, show various states of the OSN required by various conditions. The figures show the OSN as drawn in FIG. 7B, but with the ports labeled only as protection or working. Each port whose fiber link has failed is shown with a round black arrowhead, the normal working and protection connections are shown as solid lines, the restoration connections are shown as heavy solid lines, and the original, but no longer effective, connections are shown as dashed lines. The states have been grouped into four classes: (i) normal, (ii) span switching, (iii) ring switching, and (iv) protection fiber transit (P-transit). States in the latter three classes are numbered and labeled by the protection fiber or fibers that being used for restoration.

3.1.2 Span Switching States

Figure 9A:
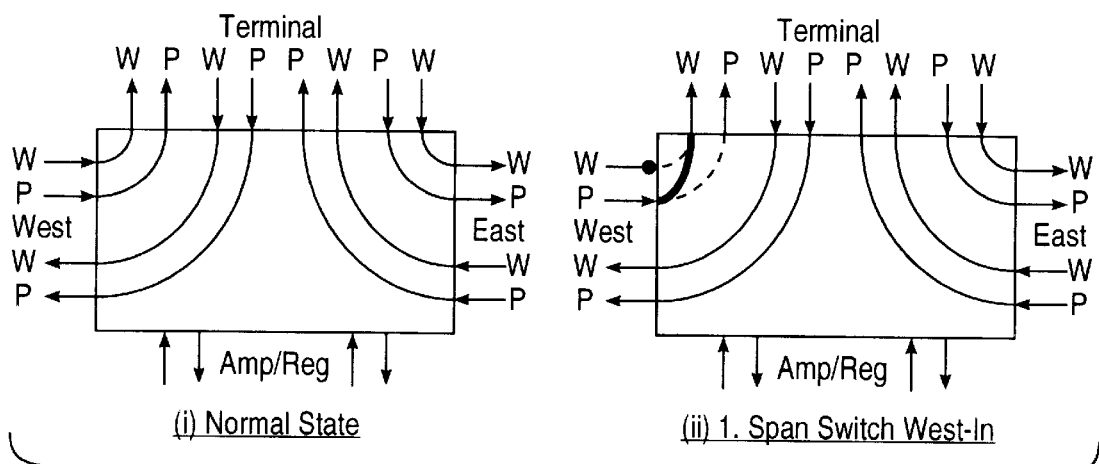
FIGS. 9A–9O show 15 span switching states for the OSN.
Figures 9B, 9C:
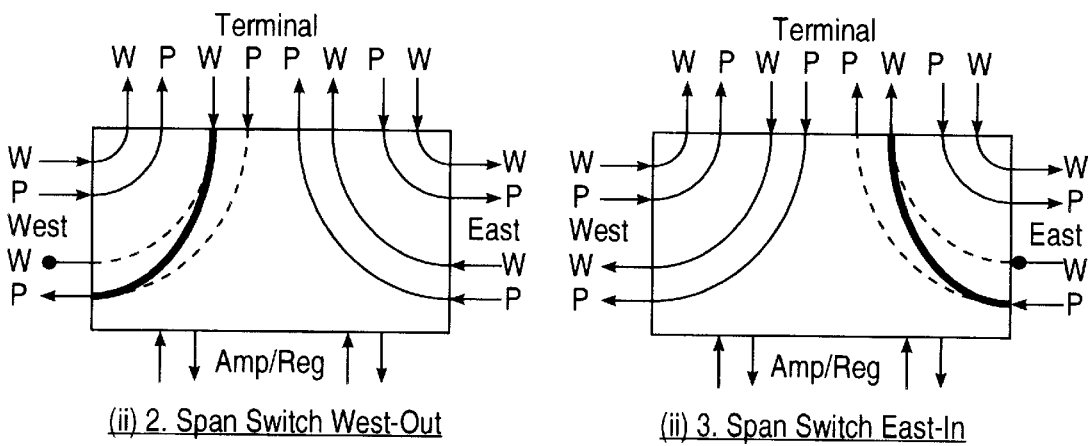
Figures 9D, 9E:
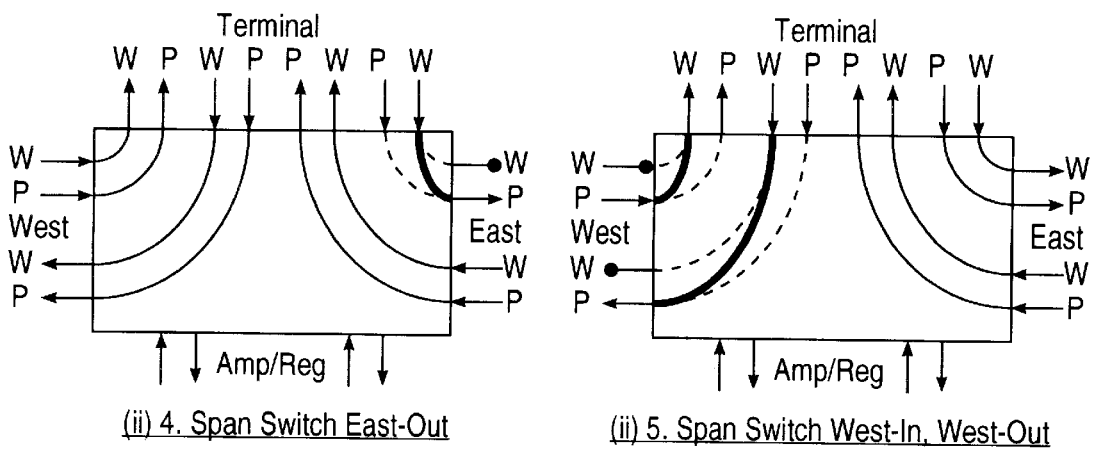
Figure 9F:
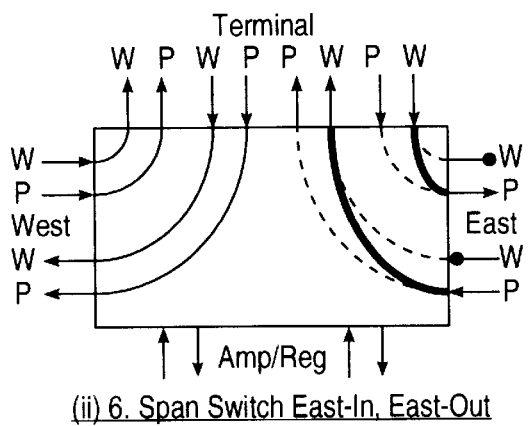
Figure 9G:
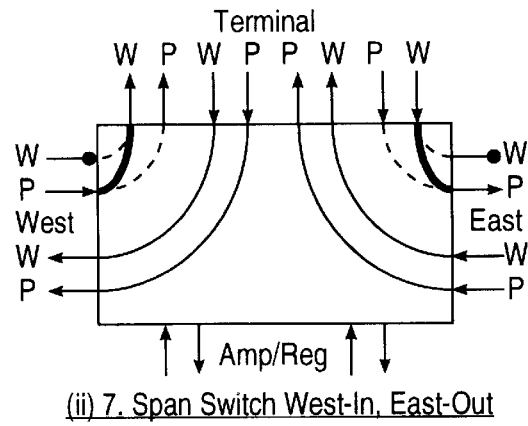
Figure 9H:
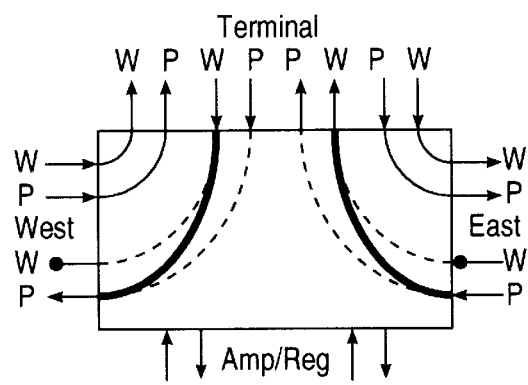
Figure 9I:
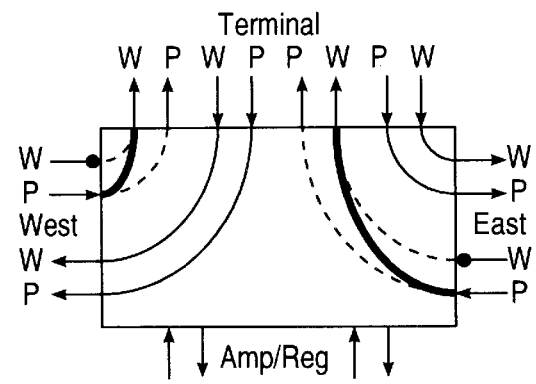
Figure 9J:
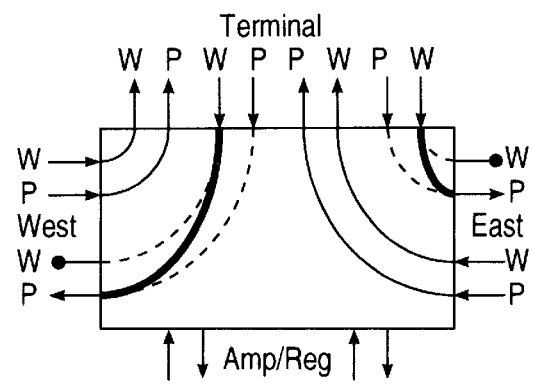
Figure 9K:
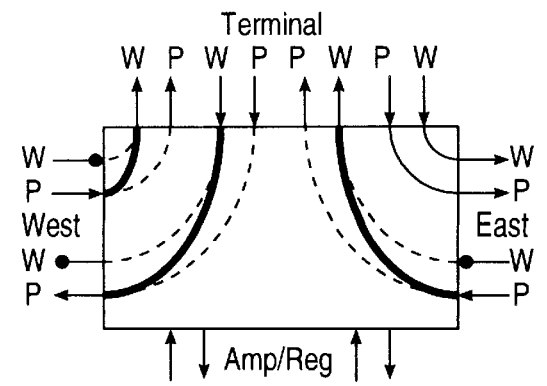
Figure 9L:
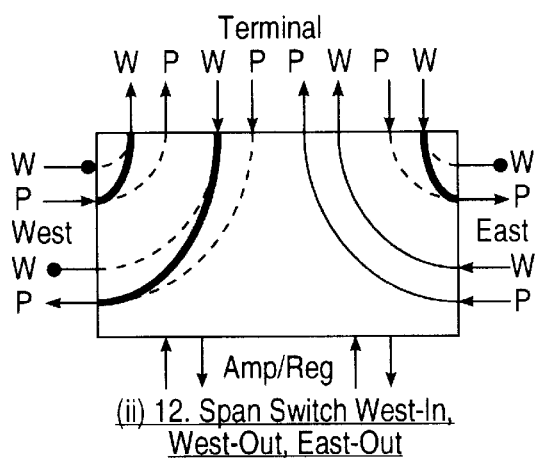
Figure 9M:
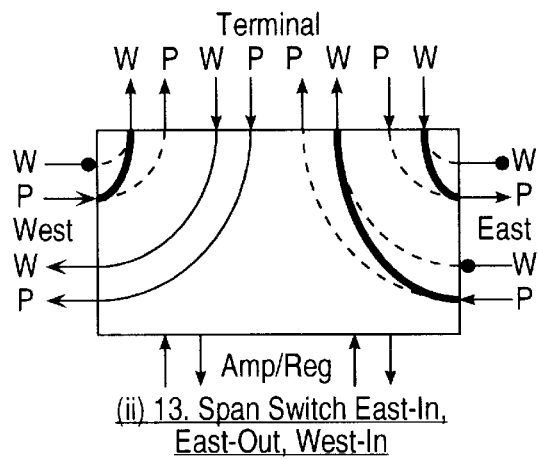
Figure 9N:
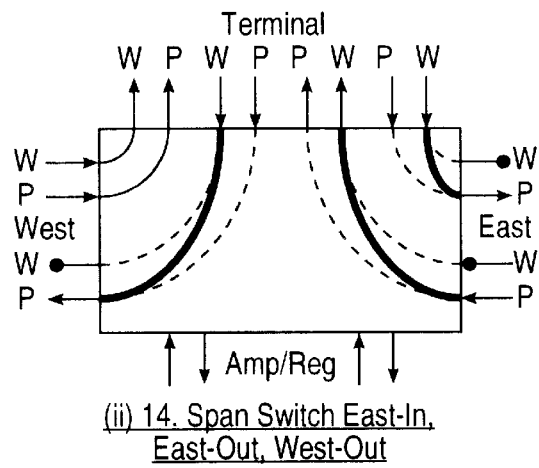
Figure 9O:
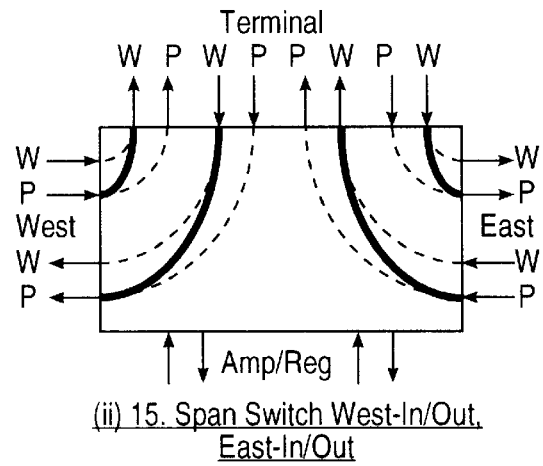

FIGS. 9A–9O show 15 span switching states for the OSN. For ease of reference, FIG. 9A also shows the OSN in its normal state. Span switching refers to a situation where a working fiber link has failed but the corresponding protection fiber has not. In this context, reference to the corresponding protection fiber means the protection fiber on the same side (east or west) and for use in the same direction (in or out with respect to the OSN). In this case, the terminal port (Rx or Tx) for the failed working fiber is coupled to the corresponding protection fiber network port (in or out).

FIGS. 9A–9D show the span switching states for a single failed fiber. These states are designated as follows:

(ii) 1. Span Switch West-In;
(ii) 2. Span Switch West-Out;
(ii) 3. Span Switch East-In; and
(ii) 4. Span Switch East-Out.

FIGS. 9E–9J show the span switching states for two failed fibers. These states are designated as follows:

(ii) 5. Span Switch West-In, West-Out;
(ii) 6. Span Switch East-In, East-Out;
(ii) 7. Span Switch West-In, East-Out;
(ii) 8. Span Switch West-Out, East-In;
(ii) 9. Span Switch West-In, East-In; and
(ii) 10. Span Switch West-Out, East-Out.

FIGS. 9K–9N show the span switching states for three failed fibers. These states are designated as follows:

(ii) 11. Span Switch West-In, West-Out, East-In;
(ii) 12. Span Switch West-In, West-Out, East-Out;
(ii) 13. Span Switch East-In, East-Out, West-In; and
(ii) 14. Span Switch East-In, East-Out, West-Out.

FIG. 9O shows the span switching states for four failed fibers. This state is designated as follows:

(ii) 15. Span Switch West-In/Out, East-In/Out.

3.1.3 Ring Switching States

Figure 10A:
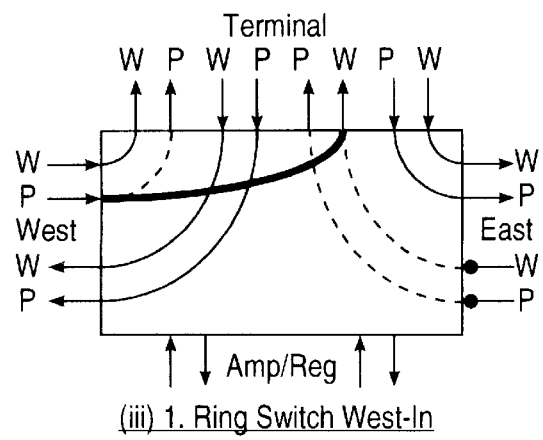
FIGS. 10A–10T show 20 ring switching states for the OSN.
Figure 10B:
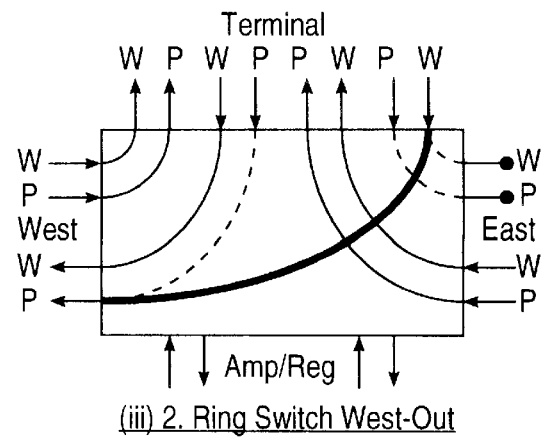
Figure 10C:
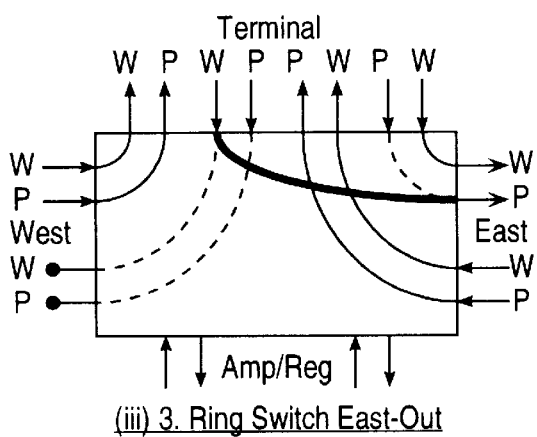
Figure 10D:
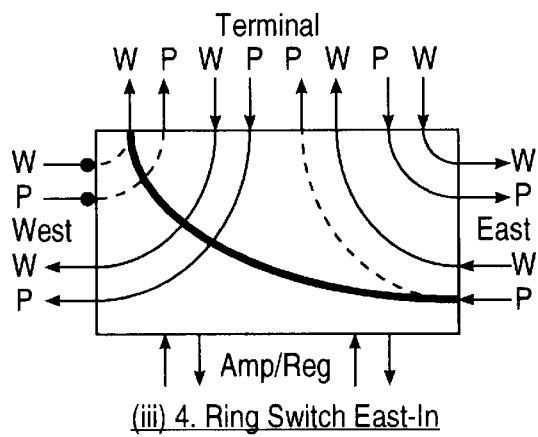
Figure 10E:
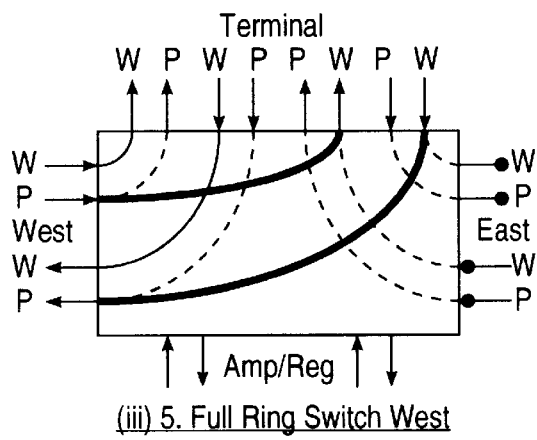
Figure 10F:
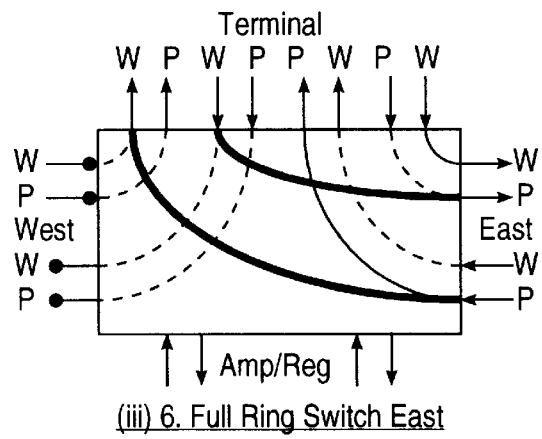
Figure 10G:
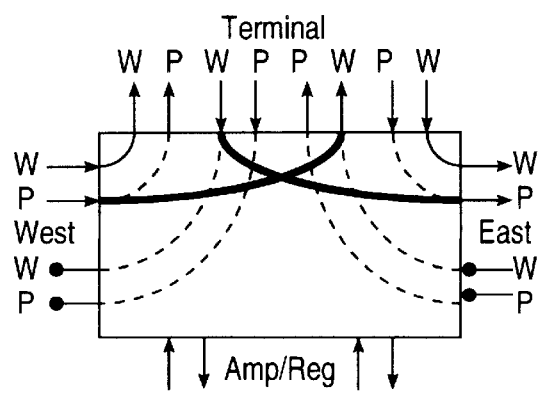
Figure 10H:
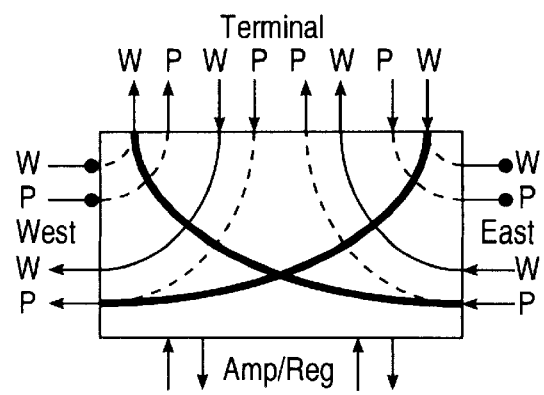
Figure 10I:
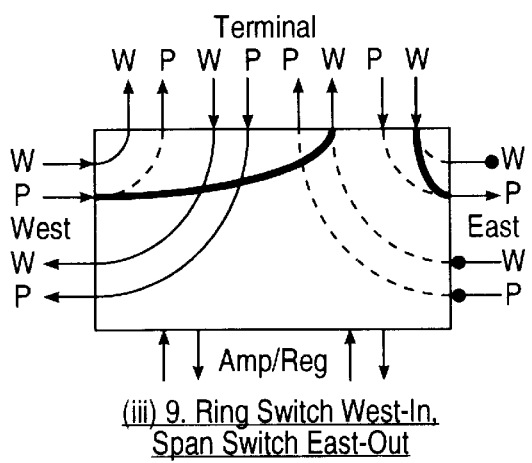
Figure 10J:
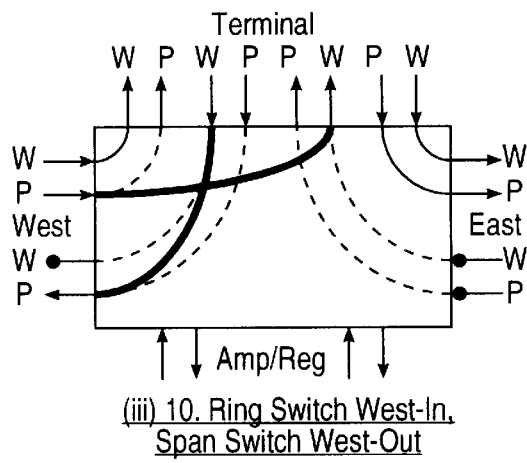
Figure 10K:
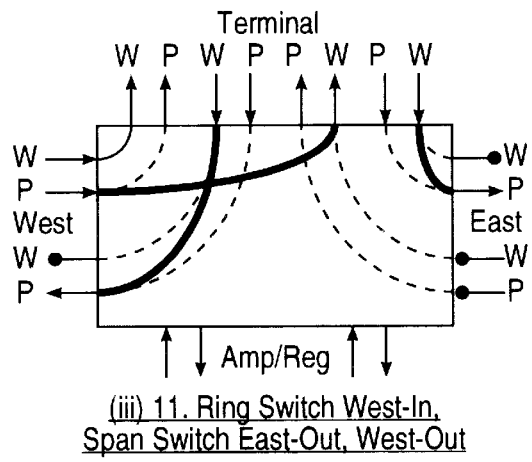
Figure 10L:
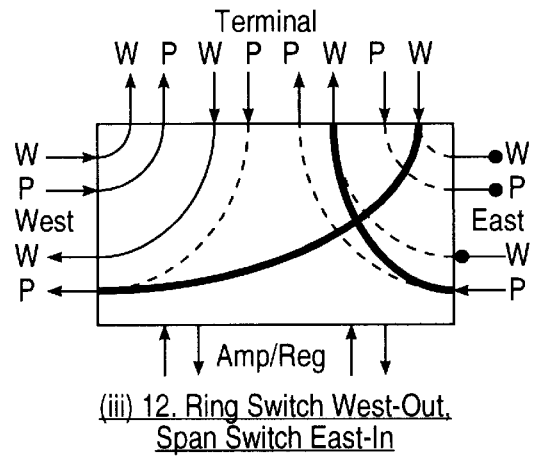
Figure 10M:
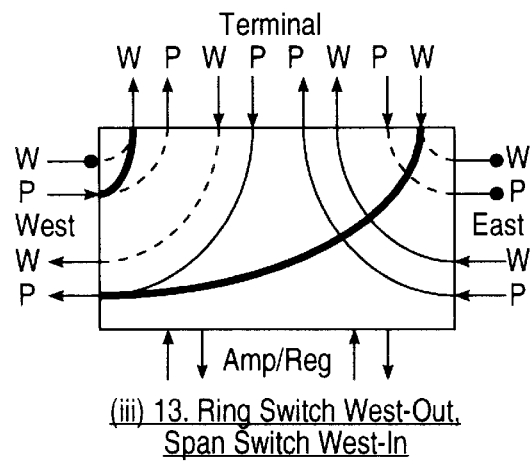
Figure 10N:
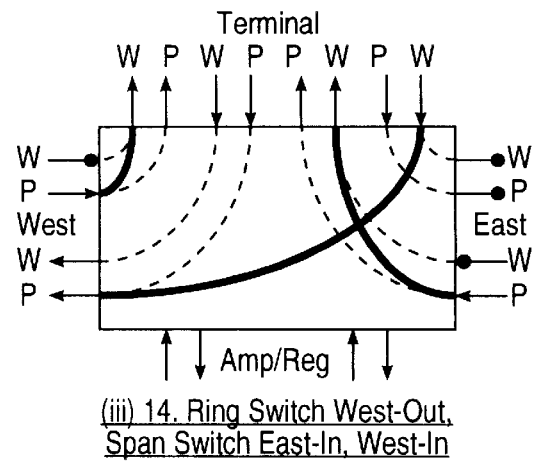
Figure 10O:
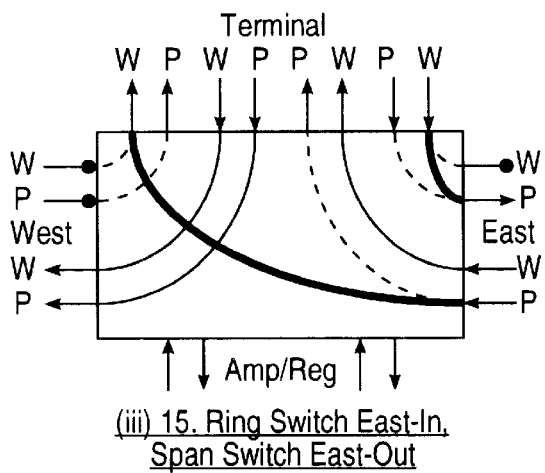
Figure 10P:
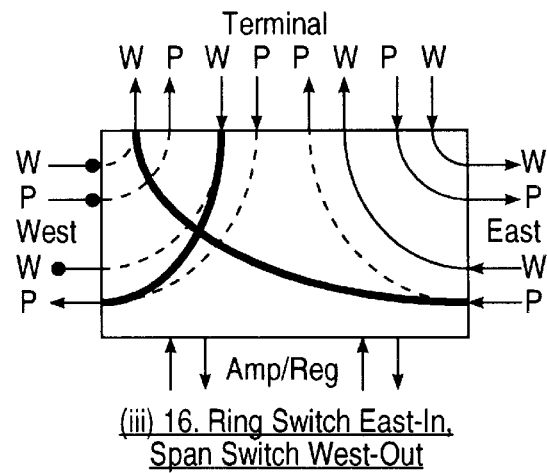
Figure 10Q:
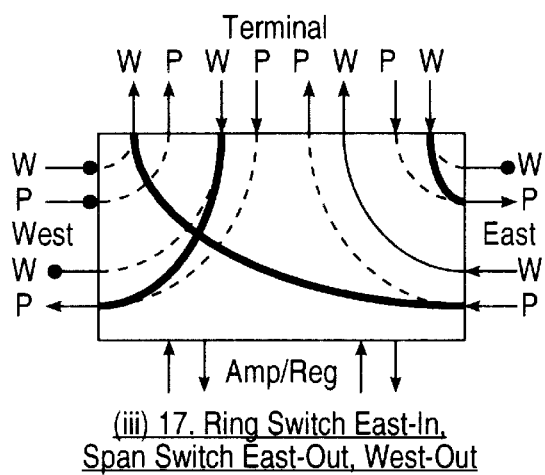
Figure 10R:
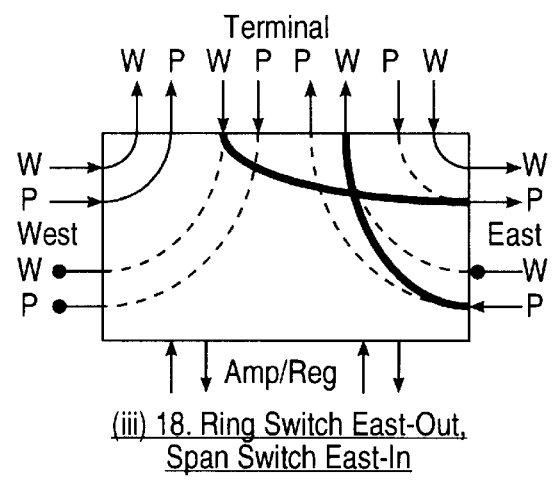
Figure 10S:
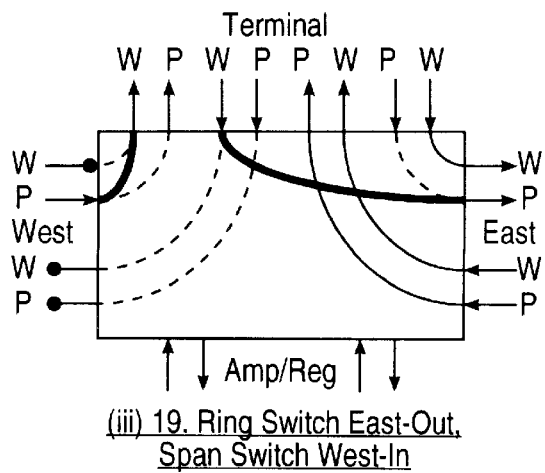
Figure 10T:
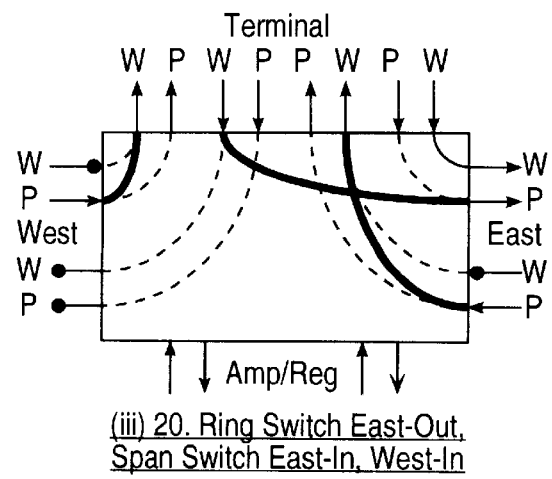

FIGS. 10A–10T show 20 ring switching states for the OSN. Ring switching refers to a situation where a working fiber and its corresponding protection fiber have failed. Ring switching can occur in the absence or presence of span switching. In this case, the terminal port (Rx or Tx) for the failed working fiber is coupled to the protection fiber network port (in or out) on the other side. Accordingly, if the west working and protection fibers have failed, the terminal port will be coupled to the relevant protection network port on the east side. As mentioned above, the labeling of the states refers to the side of the OSN (east or west) and direction (in or out) of the protection port that will couple to a viable protection fiber.

FIGS. 10A–10I show pure ring switching (working fiber and corresponding protection fiber pair both fail). FIGS. 10A–10D show the ring switching states for one failed pair. These states are designated as follows:

(iii) 1. Ring Switch West-In
(iii) 2. Ring Switch West-Out
(iii) 3. Ring Switch East-Out
(iii) 4. Ring Switch East-In FIGS. 10E and 10F show what is referred to as full ring switching, namely a circumstance where both pairs on one side have failed.

These states are designated as follows:

(iii) 5. Full Ring Switch West; and
(iii) 6. Full Ring Switch East.

FIGS. 10G and 10H show states where one pair on each side has failed. These states are designated as follows:

(iii) 7. Ring Switch West-In, East-Out; and
(iii) 8. Ring Switch West-Out, East-In.

These two states are actually not used in a current implementation since they would not be useful for the particular type of terminal equipment.

FIGS. 10I–10T show states with simultaneous ring and span switching. These states arise where one pair on one side and one or two single working fibers have failed. These states are designated as follows:

(iii) 9. Ring Switch West-In, Span Switch East-Out;
(iii) 10. Ring Switch West-In, Span Switch West-Out;
(iii) 11. Ring Switch West-In, Span Switch East-Out, West-Out;
(iii) 12. Ring Switch West-Out, Span Switch East-In;
(iii) 13. Ring Switch West-Out, Span Switch West-In;
(iii) 14. Ring Switch West-Out, Span Switch East-In, West-In;
(iii) 15. Ring Switch East-In, Span Switch East-Out;
(iii) 16. Ring Switch East-In, Span Switch West-Out;
(iii) 17. Ring Switch East-In, Span Switch East-Out, West-Out;
(iii) 18. Ring Switch East-Out, Span Switch East-In;
(iii) 19. Ring Switch East-Out, Span Switch West-In; and
(iii) 20. Ring Switch East-Out, Span Switch East-In, West-In.

3.1.4 Protection Fiber Transit States

Figure 11A:
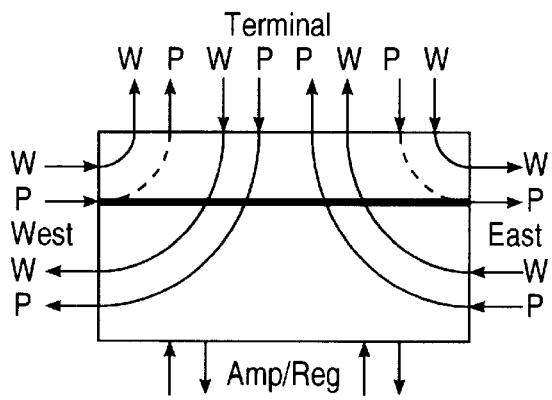
FIGS. 11A–11R show 18 protection fiber transit (P-transit) states for the OSN.
Figure 11B:
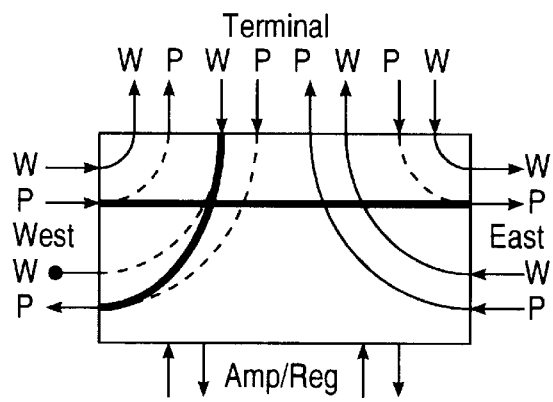
Figure 11C:
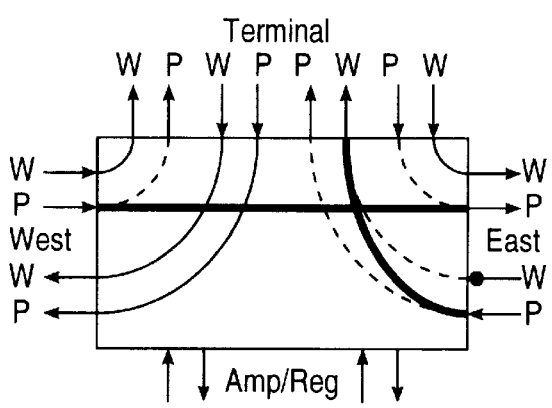
Figure 11D:
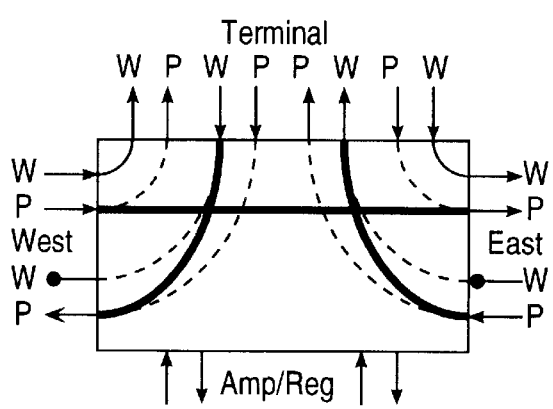
Figure 11E:
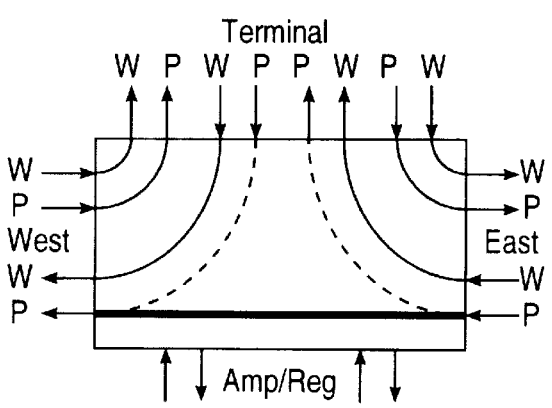
Figure 11F:
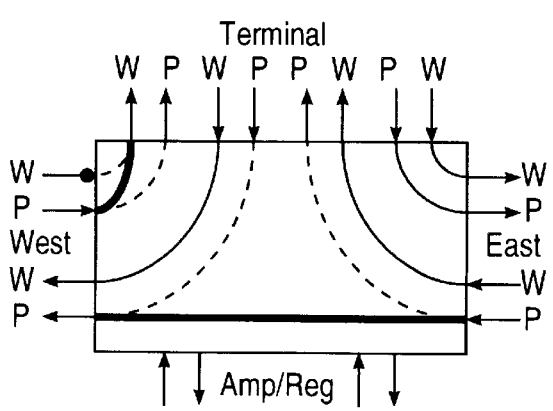
Figure 11G:
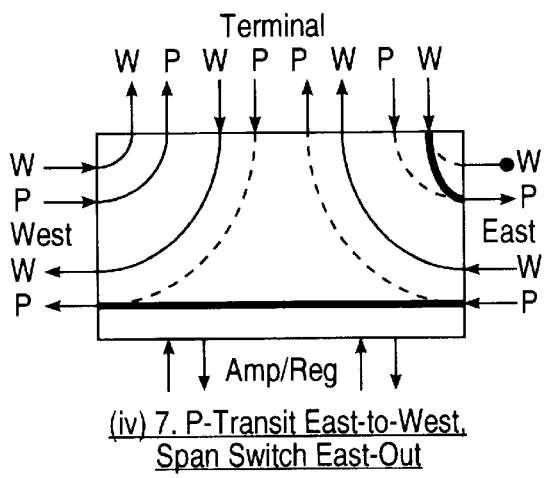
Figure 11H:
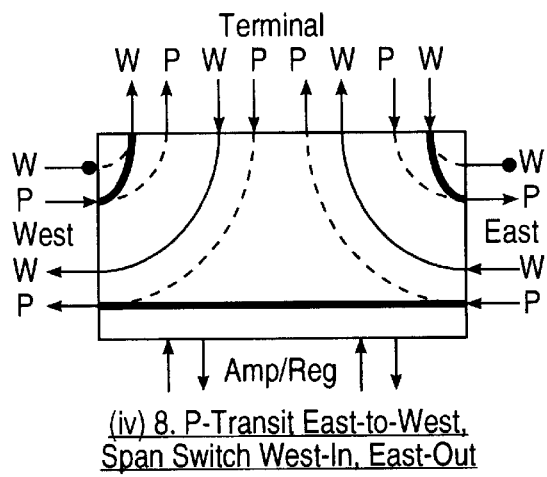
Figure 11I:
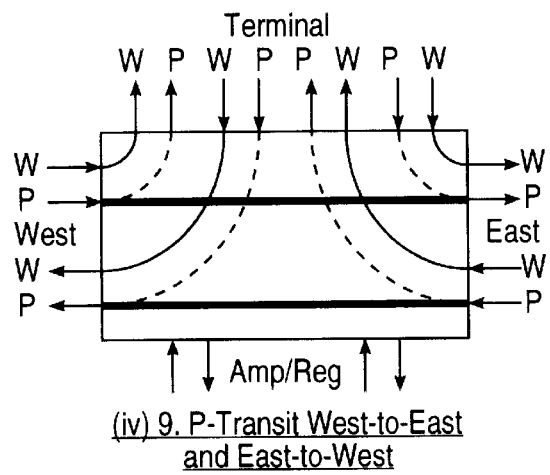
Figure 11J:
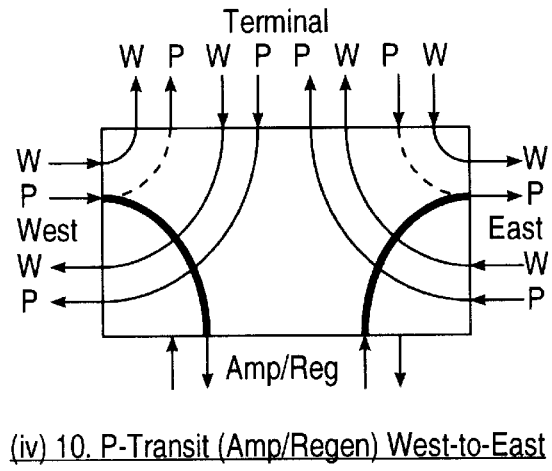
Figure 11K:
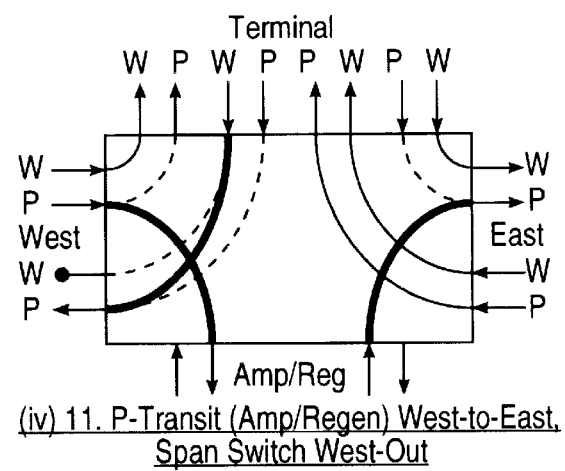
Figure 11L:
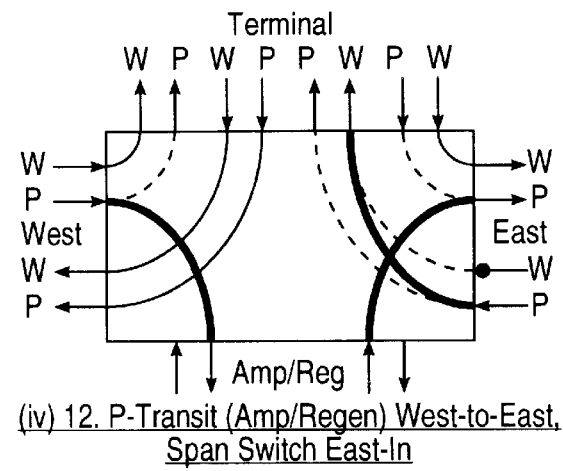
Figure 11M:
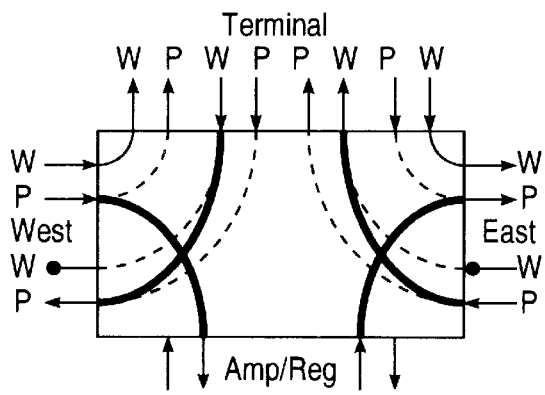
Figure 11N:
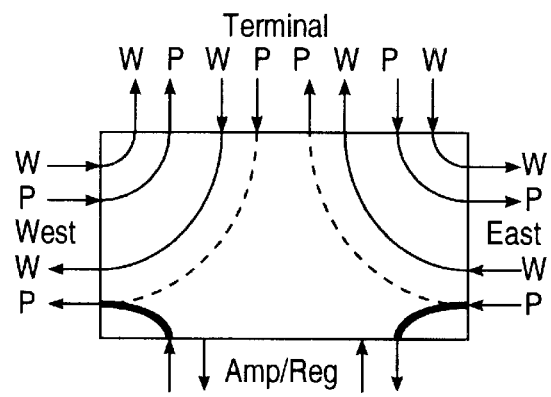
Figure 11O:
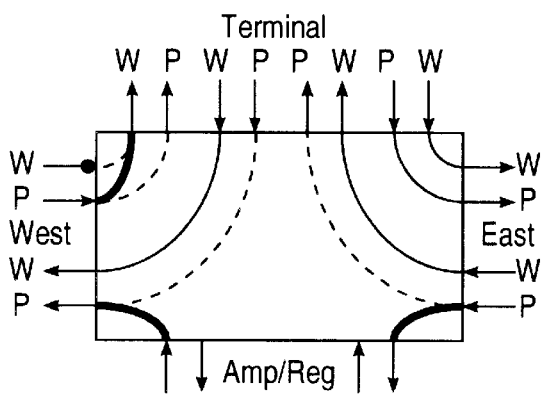
Figure 11P:
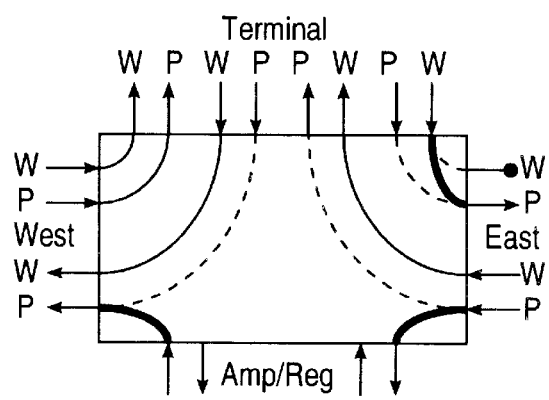
Figure 11Q:
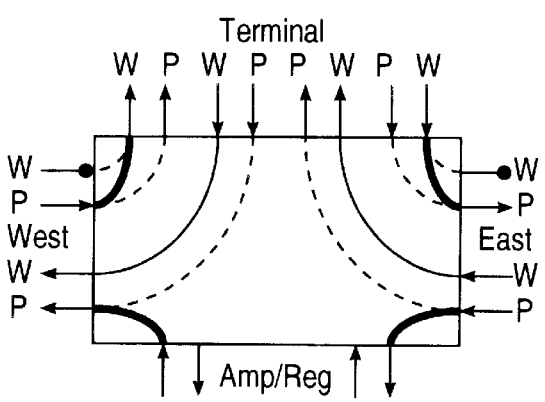
Figure 11R:
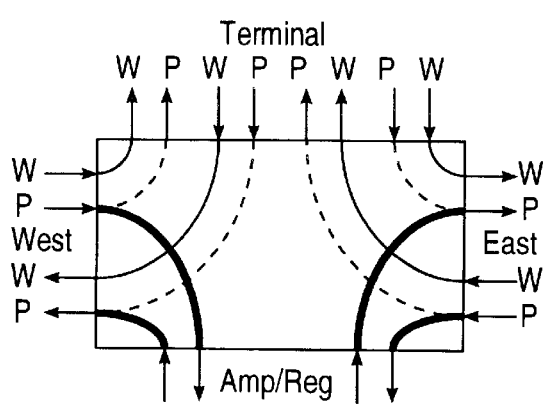

FIGS. 11A–11R show 18 protection fiber transit (P-transit) states for the OSN. These states support the propagation of multi-wavelength traffic around the ring in the event of a failure of a multi-wavelength link in the ring. Since all the nodes are not guaranteed to have WDM terminal equipment, the switched traffic does not pass through any of the intervening terminal equipment, but rather only encounters the WDM terminal equipment on either side of the failed multi-wavelength link.

FIGS. 11A–11I show a first set of the transit states that do not use the amplifier/regenerator ports, but rather provide a straight through path from an incoming protection fiber on one side od the OSN to the outgoing protection fiber on the other side of the OSN. These states, which include states where span switching is also occurring, are designated as follows:

(iv) 1. P-Transit West-to-East;
(iv) 2. P-Transit West-to-East, Span Switch West-Out;
(iv) 3. P-Transit West-to-East, Span Switch East-In;
(iv) 4. P-Transit West-to-East, Span Switch West-Out, East-In;
(iv) 5. P-Transit East-to-West;
(iv) 6. P-Transit East-to-West, Span Switch West-In;
(iv) 7. P-Transit East-to-West, Span Switch East-Out;

(iv) 8. P-Transit East-to-West, Span Switch West-In, East-Out; and (iv) 9. P-Transit West-to-East and East-to-West.

FIGS. 11J–11R show a second set of the transit states that do use the amplifier/regenerator ports. These states correspond to the first set of transit states except for the fact that the signals input on the protection fiber are directed to the amplifier or regenerator before being directed out on the protection fiber on the other side. These states, which include states where span switching is also occurring, are designated as follows:

(iv) 10. P-Transit (Amp/Regen) West-to-East;

(iv) 11. P-Transit (Amp/Regen) West-to-East, Span Switch West-Out;

(iv) 12. P-Transit (Amp/Regen) West-to-East, Span Switch East-In;

(iv) 13. P-Transit (Amp/Regen) West-to-East, Span Switch West-Out, East-In;

(iv) 14. P-Transit (Amp/Regen) East-to-West;

(iv) 15. P-Transit (Amp/Regen) East-to-West, Span Switch West-In;

(iv) 16. P-Transit (Amp/Regen) East-to-West, Span Switch East-Out;

(iv) 17. P-Transit (Amp/Regen) East-to-West, Span Switch West-In, East-Out; and (iv) 18. P-Transit (Amp/Regen) West-to-East and East-To-West.

3.2 OSN Detailed Implementation

Figure 12:
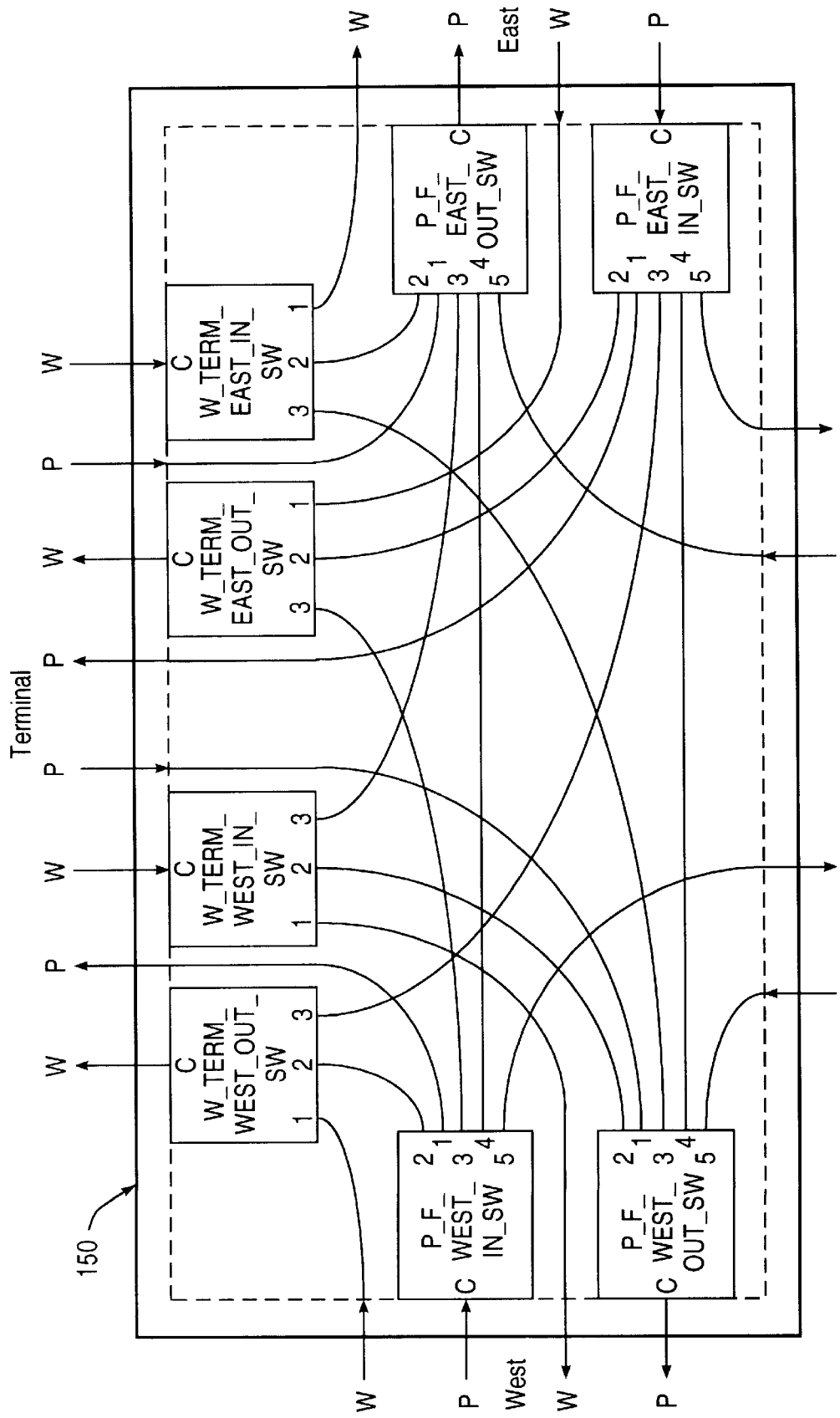
FIG. 12 is a schematic showing a particular implementation of the optical switches in the OSN.

FIG. 12 is a schematic showing a particular implementation of the optical switching portion, referred to as optical switch block 150 (or simply switch block 150), of an OSN having the states and functionality described above. From the interconnection map of FIG. 8A or the crosspoint matrix of FIG. 8B, it can be deduced that all the connectivity required in an OSN can be implemented by a small number of switches of 1×N and N×1 type. In particular, the connections shown can be realized with two 1×3 switch elements, two 1×5 switch elements, two 3×1 switch elements, and two 5×1 switch elements (8 switches). FIG. 12 shows the switches and interconnections for switch block 150 explicitly. A particular state of the OSN can then be specified by the states of the switches.

As can be seen, first and second 3×1 switches, designated W_TERM_WEST_OUT_SW and W_TERM_EAST_OUT_SW have their single output terminals coupled to the west and east working receiver ports, while first and second 1×3 switches, designated W_TERM_WEST_IN_SW and W_TERM_EAST_IN_SW have their single input terminals connected to the west and east working transmitter ports. Further, first and second S×1 switches, designated P_F_WEST_OUT_SW and P_F_EAST_OUT_SW, have their single output terminals connected to the west and east network protection output ports, while first and second 1×5 switches, designated P_F_WEST_IN_SW and P_F_EAST_IN_SW, have their single input terminals connected to the west and east network protection input ports. The multiple terminals on the switches are connected to the other OSN ports or to multiple terminals on other switches to allow the OSN to assume the switch states described above.

While a general N×N crosspoint matrix switch may be used to implement the required functions of an OSN, an implementation such as that shown in FIG. 12 provides significant economies. A full 10×10 switch matrix would require 10 1×10 switch elements and 10 10×1 switch elements.

Further, in many switch technologies, 1×3 and 1×5 switch elements are far easier and cheaper to fabricate than 1×10 or 10×1. Thus the preferred implementation of the OSN offers savings in the number of switches (8 versus 20) as well as the cost per switch. Even though the specific OSN uses a sparse 10×10 matrix (see FIG. 8B), OSNs for various other network configurations can be designed using the same approach, possibly with a different number of ports or a different desired set of states.

The OSN can use a variety of switch technologies. These include, but are not limited to semiconductor optical amplifier based switch elements and optical directional couplers (1×N and N×1), electro-optic and polymer based lightwave switches (1×N and N×1), opto-mechanical lightwave switches (1×N and N×1), and integrated lightwave circuits to realize the optical switching node. In a current implementation, opto-mechanical switches procured from E-TEK Dynamics, Inc. of San Jose, California were used. Optical switches are generally reversible (at least for passive switch technologies), so whether a switch is a 1×N switch or an N×1 switch depends on the way it is connected.

3.3 OSN Controls and Software

Figure 13:
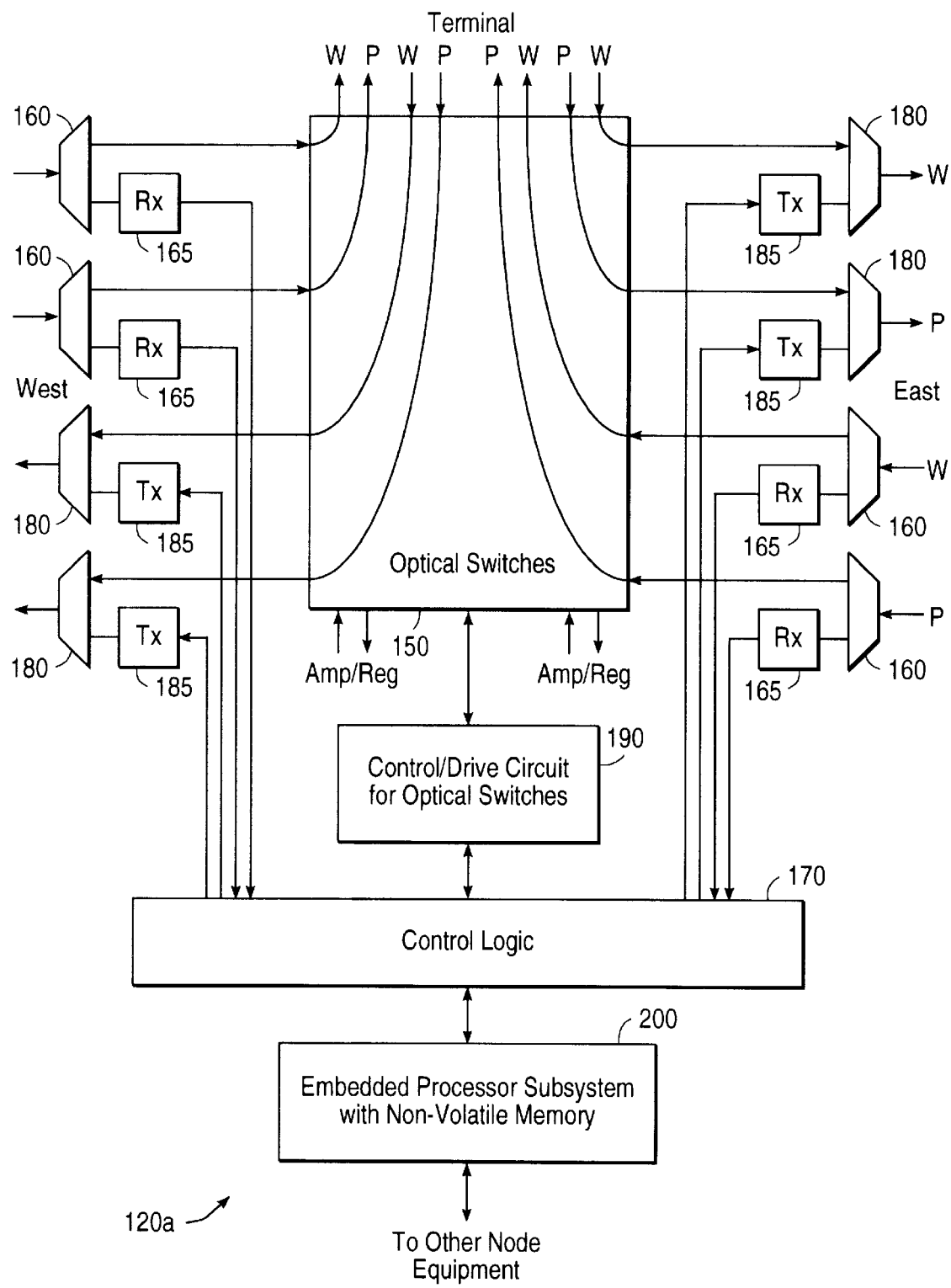
FIG. 13 shows additional details of the OSN, including control logic and additional elements to implement a restoration supervisory channel.

FIG. 13 is an optical and electrical schematic of an embodiment of OSN 120a, and shows additional details of the OSN, including control logic and additional elements to implement a restoration supervisory channel. As mentioned above, the OSN control circuitry is used to operate the optical switching node and provide the necessary messages which are transmitted over an optical restoration supervisory channel to adjacent nodes. The messages sent on the restoration supervisory channel are sometimes referred to as pilot tones. The communication medium for the supervisory messages is the fiber network itself, and the messages are merged with the network data using WDM couplers, as will now be described.

The elements in OSN 120a include, in addition to switch block 150, WDM couplers for placing messages on the network links and taking them off the links. Each input network port has an associated WDM demultiplexer 160, which directs the optical network signals to the corresponding input network port on switch block 150 and directs the optical supervisory messages to a respective opto-electrical receiver 165. The signals from receivers 165 are directed to control logic 170. Similarly, each output network port has an associated WDM multiplexer 180, which combines the optical network signals from the corresponding output network port on switch block 150 with optical supervisory messages generated by a respective opto-electrical transmitter 185. Transmitters 185 are driven electrically by control logic 170. Control logic 170 communicates with a circuit 190, which controls and drives the optical switches in switch block 150.

Data processing circuits for ATM or other data processing are associated with the transmitters and receivers. Conceptually, they can be considered part of the transmitters and receivers, or part of the control logic. In a specific implementation, PMC 5346 S/UNI Lite chips are used.

The supervisory messages are carried on a wavelength that is removed from the wavelengths of the network data messages (1530–1570 nm), and typically are at a lower bit rate (say OC-3 or 155 Mbps). Thus, while the fiber amplifiers in the network may not provide as much gain as they do for the signals in the main wavelength band, the detectors in receivers 165 do not need as much gain for the signals at the lower bit rate. Candidate wavelengths include 1310 nm, 1480 nm, 1510 nm, and 1625 nm, with 1510 nm being presently preferred.

A computer such as an embedded processor 200 is coupled to the control logic, and stores restoration software in an on-board or off-chip non-volatile memory (e.g., PROM or flash EPROM). The restoration software: (a) processes incoming supervisory messages and makes logical decisions for operation of the optical switches (i.e., to set the switches to the appropriate state); and (b) generates supervisory messages to be sent to adjacent nodes to allow them to set their respective states accordingly.

While it is possible to implement centralized control of the OSNs in the network, it is preferred to have each node operate autonomously on the basis of signals it receives from its adjacent nodes. Each OSN sends "keep alive" messages to its adjacent nodes at regular intervals, and each OSN monitors such incoming messages to detect a loss of signal. Depending on which fiber link has failed, OSN processor 200 determines which type of switching needs to be performed, and operates to control the switches accordingly. The OSN also sends messages to its adjacent nodes, informing them of the action taken, so they can reconfigure themselves accordingly.

3.4 OSN Operation

Figure 14:
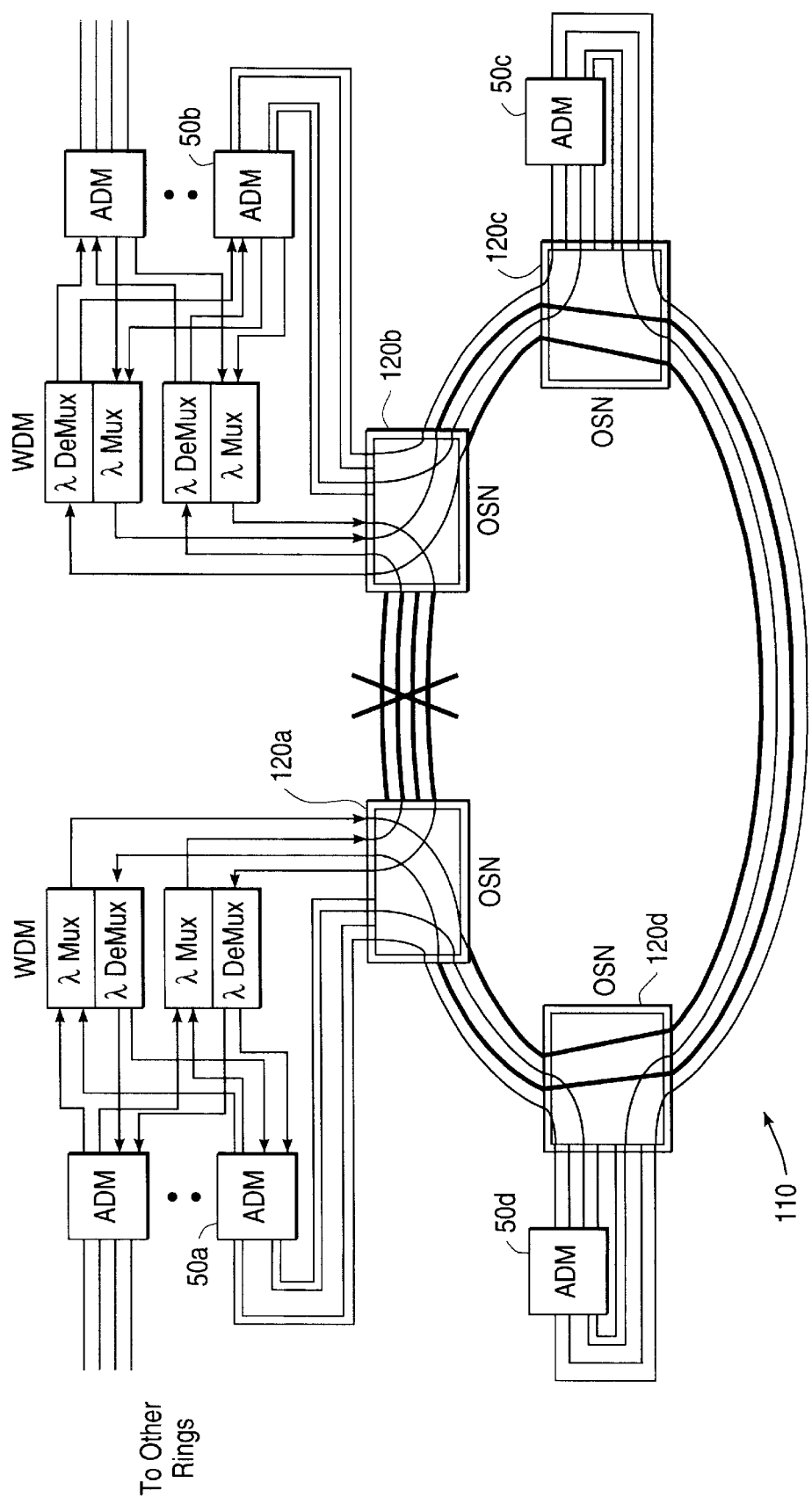
FIG. 14 illustrates full ring switching by the OSNs in response to a failure of all four fiber links between a pair of nodes having WDM equipment.

FIG. 14 illustrates the operation of the OSNs and OSN software in one possible scenario, namely a complete failure of all four fiber links between OSNs 120*a* and 120*b*. As shown in the figure, the protection fibers have been switched to provide WDM signal transit while leaving the working fibers between the ADMs undisturbed. The ultimate state of the ring would have the OSNs in the following states:

OSN 120*a* in state (iii) 5. Full Ring Switch West (FIG. 10E);

OSN 120*b* in state (iii) 6. Full Ring Switch East (FIG. 10F); and

OSNs 120*c* and 120*d* in state (iv) 9. P-Transit West-to-East and East-to-West (FIG. 11I).

However, no single message from any of the OSNs would cause this, but rather a sequence of messages would be required, as will now be described. Assume that no other abnormal conditions were existing at the time of the failure.

In this case OSN 120*a* would detect the loss of incoming signals on its east side and send a message in both directions that it has detected such a loss. OSN 120*a* would then set the appropriate switches to route signals incoming on P-West-(In) to Rx-W-East.

Meantime, OSN 120*b* would detect the loss of incoming signals on its west side and send a message in both directions that it has detected such a loss. OSN 120*b* would then set the appropriate switches to route signals incoming on P-East-(In) to Rx-W-West.

In response to the messages from OSNs 120*a* and 120*b*, OSNs 120*c* and 120*d* would determine that full ring switching was to be in effect, and would set their appropriate switches to route signals incoming on P-West(In) to P-East-(Out) and signals incoming on P-East-(In) to P-West-(Out).

In the configuration shown in FIG. 14, OSNs 120*c* and 120*d* transition to their respective pass-through transit states without regeneration. In general, it is not necessary that every OSN have an associated regenerator. Rather, as noted above, optical/electrical/optical regeneration is only required at 600-km intervals, and so it may be that only some of the OSNs in the network have associated regenerators. To the extent that a given OSN has an associated regenerator, it would enter state (iv) 18. P-Transit (Amp/Regen) West-to-East and East-To-West (FIG. 11R).

3.5 SONET (ADM) Switching and OSN Switching

While FIG. 14 shows the restoration in ring 110 using the OSNs, it does not address the issue of how restoration occurs in the other single-wavelength rings that share the multi-wavelength link but may not have OSNs. These other rings do their normal ring switching as controlled by the ADMs on those rings. When the multi-wavelength link is restored through the OSN switching as described above, these ADMs recover traffic on their original working ports and revert to normal operation.

The SONET switching and the OSN switching can operate without interfering with each other. For example, there is no constraint on the relative speed of ring switching response time. Put another way, the OSN switching time does not need to be faster than the SONET ring switching time (5–50 ms). Thus, if the SONET switching (in the ADMs) occurs faster than OSN restoration, the ADMs revert to their original state after OSN switching. On the other hand, if the SONET switching occurs more slowly than the OSN restoration, the ADMs do not see a (verified) break on the link before traffic is restored through the OSNs. Thus, a racing condition is never created since the switching processes are mutually independent.

3.6 Restoration Software Details

Figure 15A:
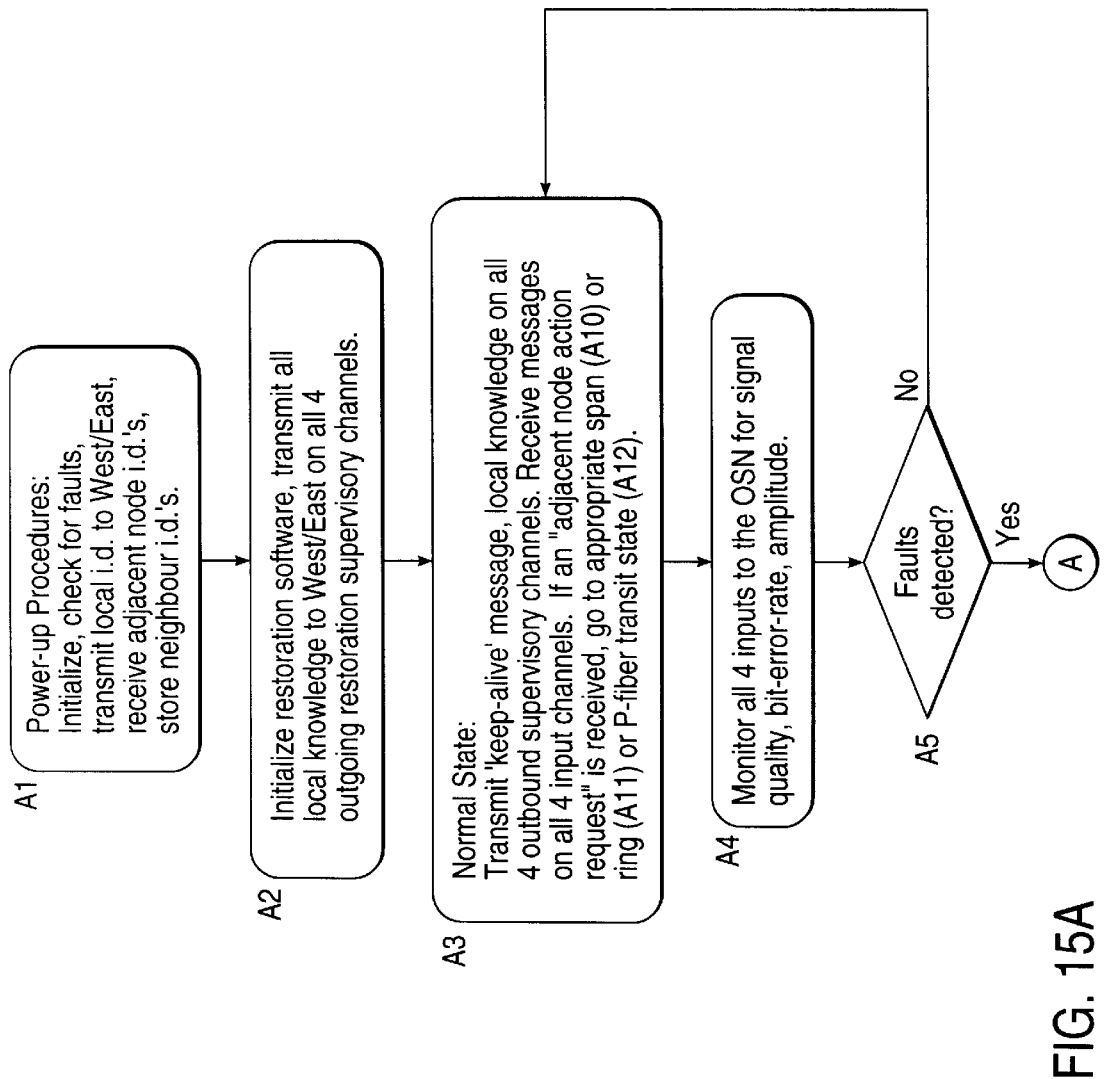
FIGS. 15A–15C, taken together, form a flowchart of the OSN software in a specific embodiment
Figure 15B:
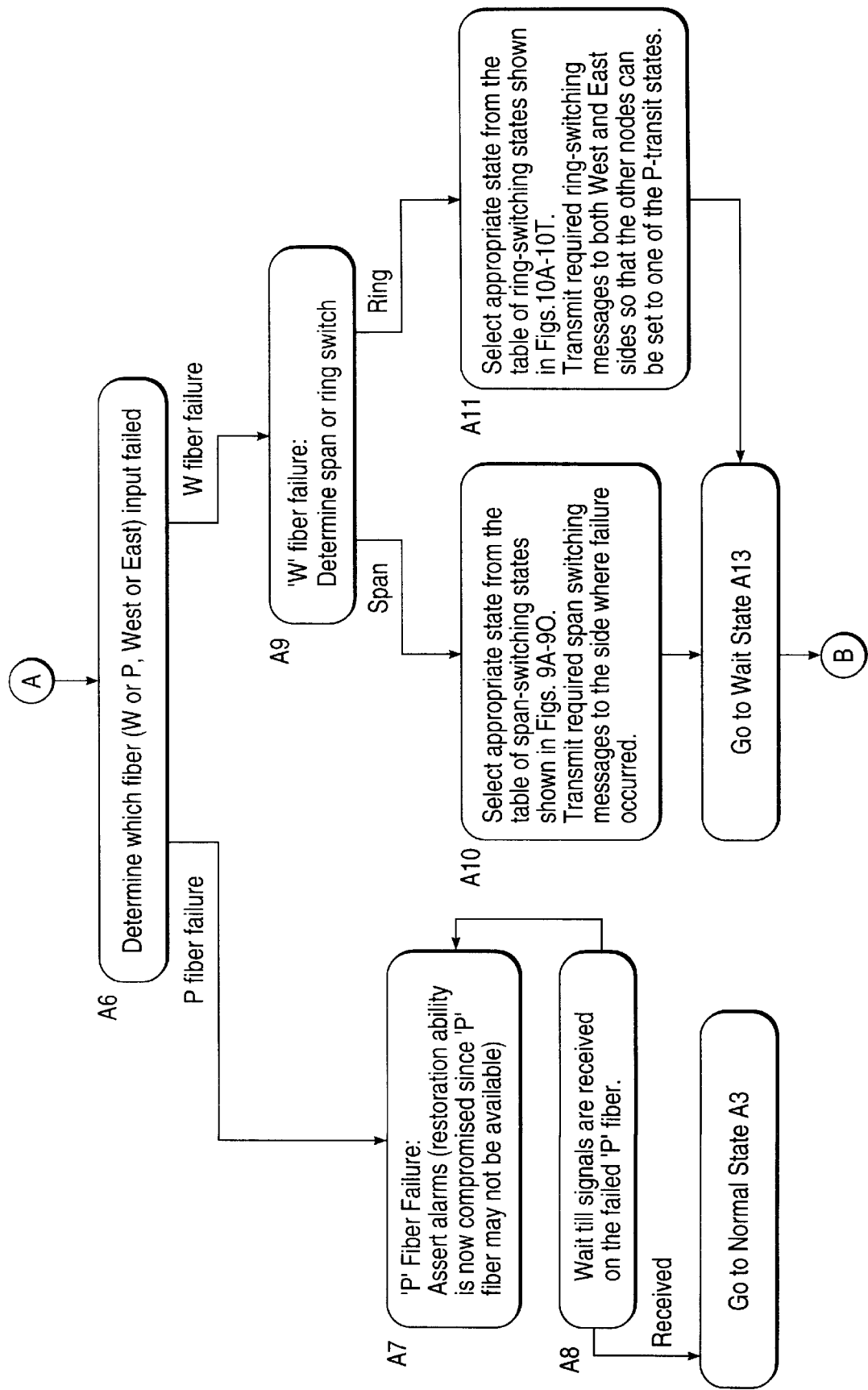
Figure 15C:
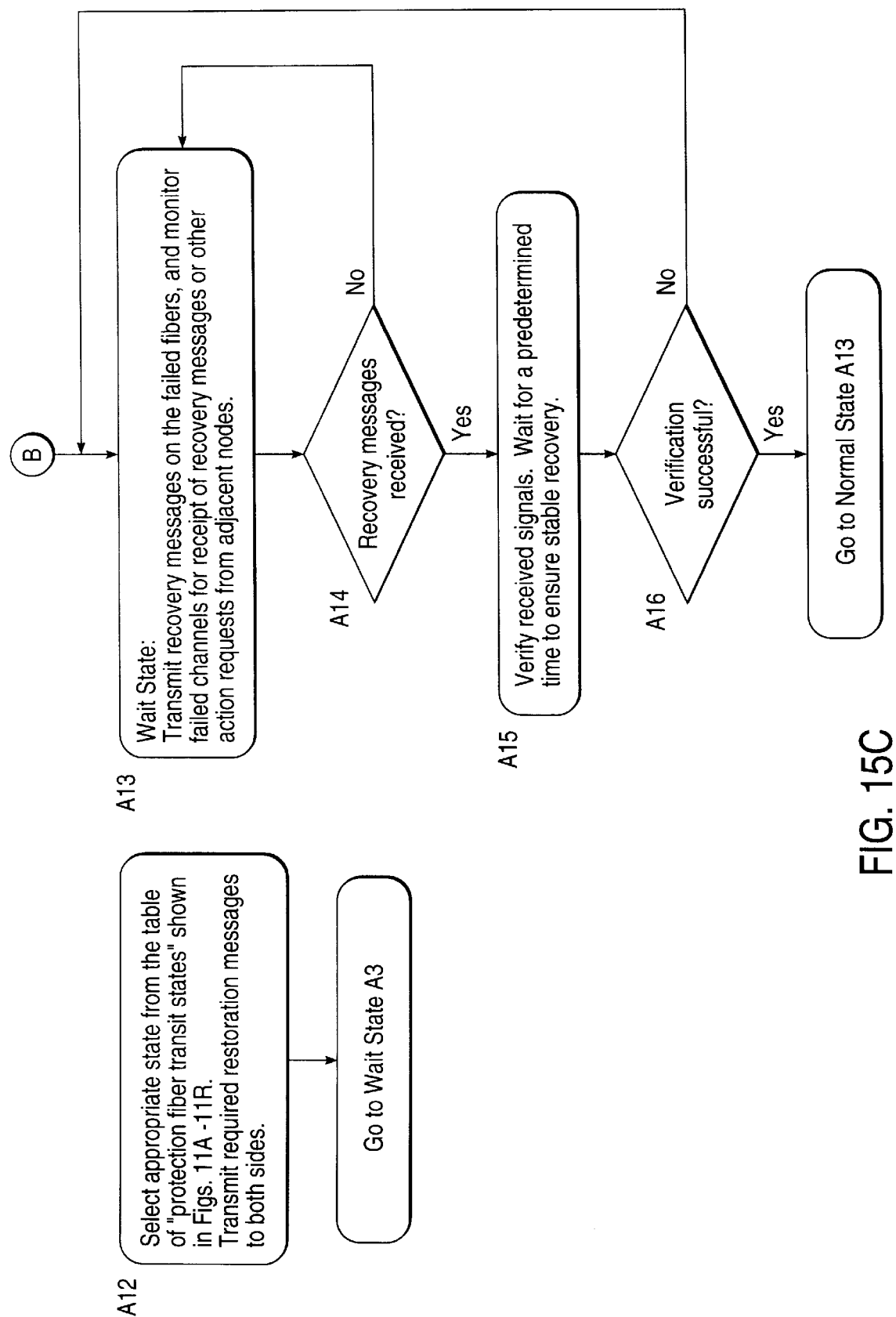

FIGS. 15A–15C, taken together, form a flowchart of the OSN software in a specific embodiment. As described above, each OSN has two inputs (working and protection) on each side (West and East). Thus it can monitor the presence or absence of signal on these two inputs. When there is any disruption in the signal, the software resident at the OSN determines which signal failed, and changes state of the switches to a suitable position such that the lost signal can now be received from a protection fiber input, either from the same direction (span switching) or the opposite direction (ring switching). While the switches are being changed to the new state, the OSN also communicates this change of state and any action request/instruction to its adjacent OSNs if necessary so that the adjacent OSNs can take appropriate action to route the signals.

Each OSN communicates with its two adjacent nodes over all four fibers interconnecting the OSNs. In the current implementation, ATM packets are used over each communication channel to send and receive messages. Each such channel between the OSNs is referred to as a restoration supervisory channel. The restoration messages sent by each OSN contain local information about that node including:

Node i.d. (a unique i.d. assigned to each node);

Logical state of the node;

Physical state of the switches at the node;

Status of any equipment faults at the node (e.g., failure of laser or other hardware)

Each OSN also sends instructions to other nodes for carrying out certain actions given the local knowledge at that node.

The OSN software is described in further detail in the following appendices filed herewith and incorporated by reference in their entirety for all purposes:

Appendix 1–96 pages of source code on 24 sheets;

Appendix 2–(51 pages on 13 sheets) Span Switch Restoration States (file Restoration_States_Span) contains pseudo-code for the Span-Switch states (ii).x;

Appendix 3–(62 pages on 16 sheets) Ring Switch Restoration States (file Restoration_States_Ring) contains pseudo-code for the Ring-Switch states (iii).x;

Appendix 4–(58 pages on 15 sheets) P-Transit Switch Restoration States (file Restoration_States_Transit) contains pseudo-code for the Transit states (iv).x;

Appendix 5–(52 pages) Adjacent Node Action Request Table (file ANAR_Table) sets forth the logical states to which nodes are to transfer (and the corresponding messages to be sent) on receipt of certain messages from the adjacent nodes. Each node has a WEST and an EAST adjacent node. The tables specify what the software is to do when an adjacent node requests a certain action.

4.0 Additional Features and Alternatives

4.1 OSN Sub-Module

Figure 16A:
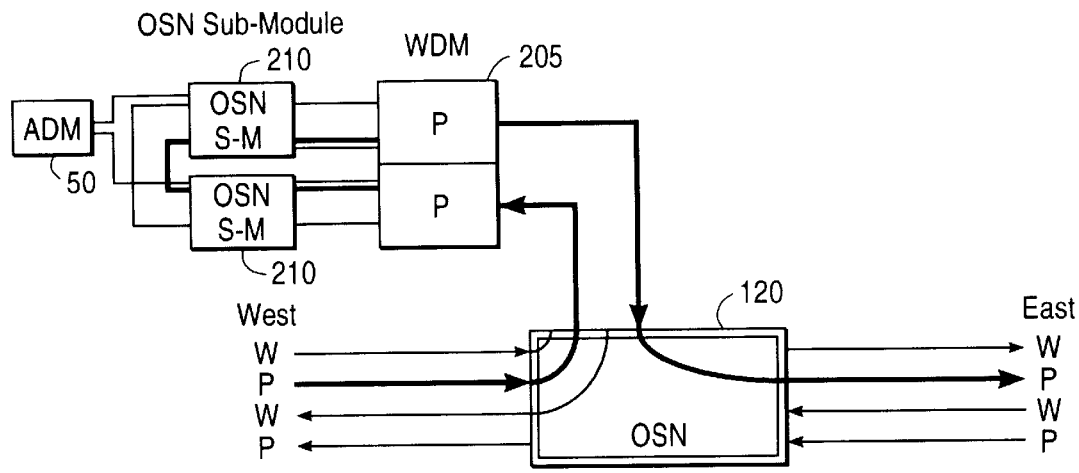
FIGS. 16A–16C show the use of OSN sub-modules to achieve additional functionality.

FIG. 16A shows how a protection WDM terminal 205 at a network node can be used in place of a separate regenerator. The ADM (one of multiple ADMs at this node) and OSN at this node are designated by respective reference numbers 50 and 120, corresponding to earlier figures. This possible elimination of the need for a separate regenerator is based on a recognition that when the OSN at the node is in one of its bypass states, the relevant portions of the ADM's protection circuitry are not in use and the protection ports of the ADMs can be bypassed. The figure shows the protection paths into the WDM and the ADM with the bypass path for one of the wavelength channels drawn as a heavy line. The working fiber paths are omitted for clarity.

A set of separate switching arrays, referred to as OSN sub-modules 210 are disposed between the WDM terminal and the ADMs. Each sub-module includes as many 1×2 switches as there are wavelength channels. FIG. 16A shows how regeneration can be provided for west-to-east transit using the WDM terminal that interfaces the ADMs to the link on the west side of the node. It will be apparent that if the node has WDM equipment that interfaces the ADMs to the link on the east side of the node, additional sub-modules can be disposed between the additional WDM equipment and the east sides of the ADMs at the node.

Figure 16B:
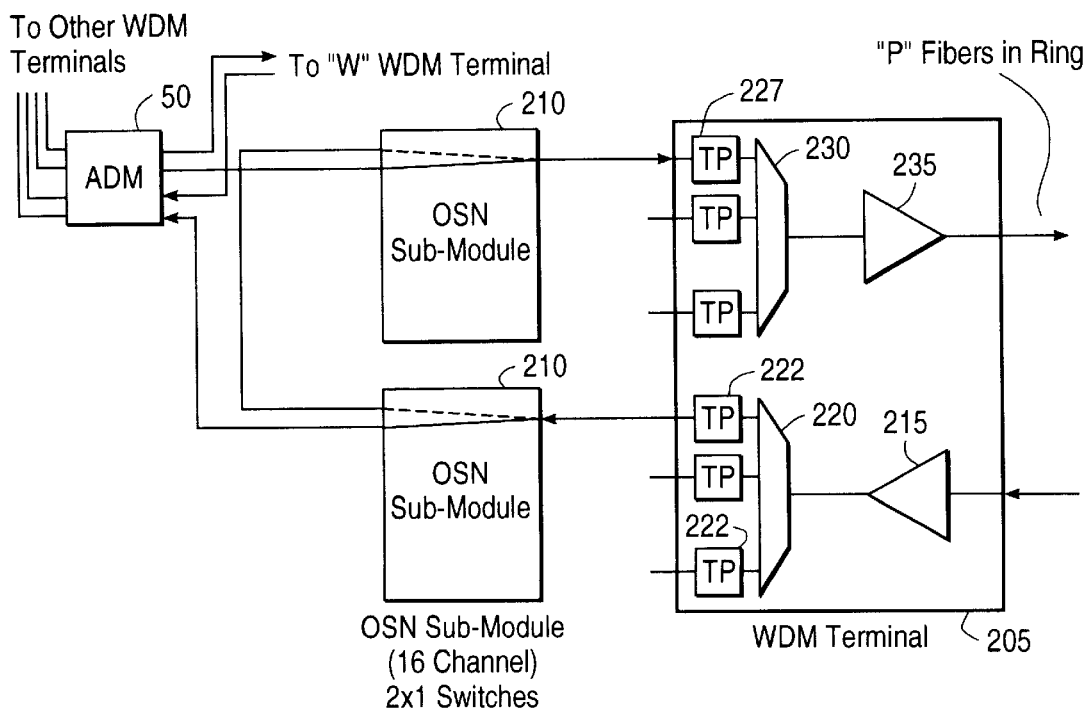
Figure 16C:
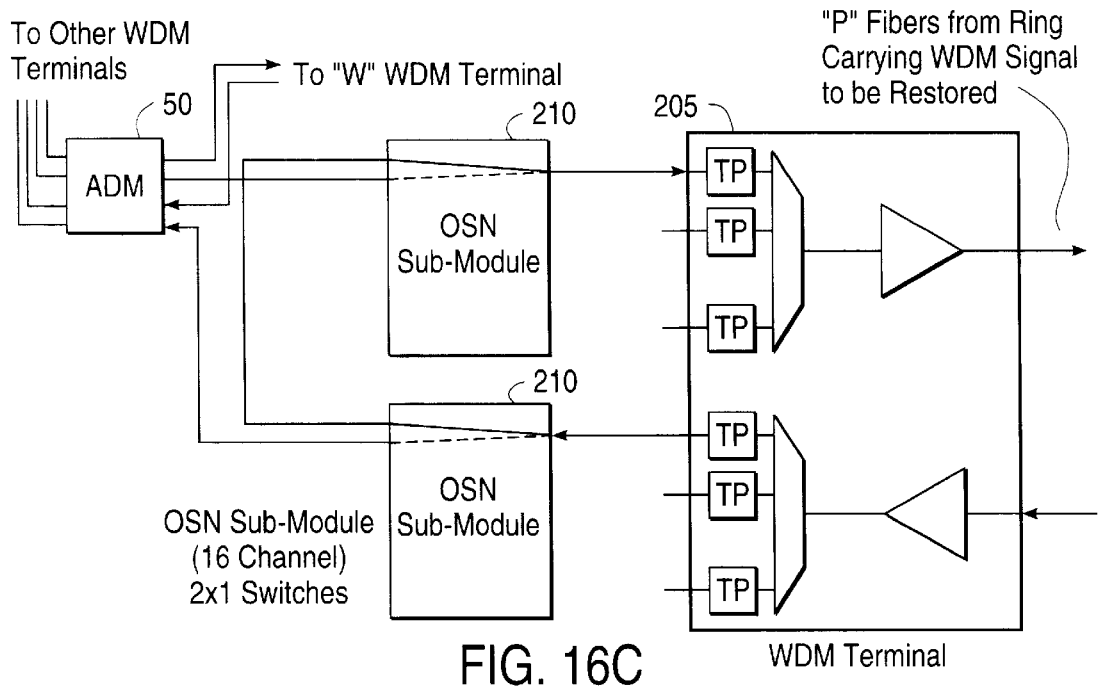

FIG. 16B shows the OSN sub-modules in their normal state, where they couple the protection fibers to the ADM protection ports as if the sub-modules were not there. FIG. 16C shows the OSN sub-modules in their ADM bypass state where they bypass the ADM and cause the WDM terminal to act as a pass-through regenerator. The portion of the WDM terminal for the protection fiber from the OSN includes an optical amplifier 215, a wavelength demultiplexer 220, and separate transponders 222 for each wavelength channel. Similarly, the portion of the WDM terminal for the protection fiber to the OSN includes separate transponders 227 for each wavelength channel, a wavelength multiplexer 230, and an optical amplifier 235.

The regeneration (signal conditioning) takes place in the transponders that are part of the protection WDM terminal. Thus, the incoming wavelength channels on the single fiber are first optically amplified by amplifier 215 and optically demultiplexed by demultiplexer 220 onto separate fibers, whereupon the individual wavelength channels are converted to electrical signals, which are conditioned and reconverted to optical signals by transponders 222. In the ADM bypass state, the OSN sub-module then routes the individual optical signals to the other portion of the WDM terminal where the signals are conditioned by transponders 227 and then put on a suitable wavelength for multiplexing by multiplexer 230, amplification by amplifier 235, and transmission through the fiber. It will be appreciated that the bypass path could possibly include a separate WDM terminal depending on how the WDM terminals are deployed in the node.

4.2 Bidirectional Supervisory Channel and Network Channel

As described above and shown in FIG. 13, supervisory messages are sent on working and protection fibers only in the direction of the network data traffic on those fibers. It is possible, however, and there are potential benefits to having bidirectional supervisory messages sent on each fiber, even if that fiber is only carrying network data in one direction. In the system with unidirectional supervisory messages, the OSN only "learns" of a failure in an outgoing link when the OSN at the other end of the link fails to receive messages and notifies the remaining OSNs of that fact. Thus the message regarding the failure needs to propagate around the ring, which can slow down the restoration switching.

Figure 17A:
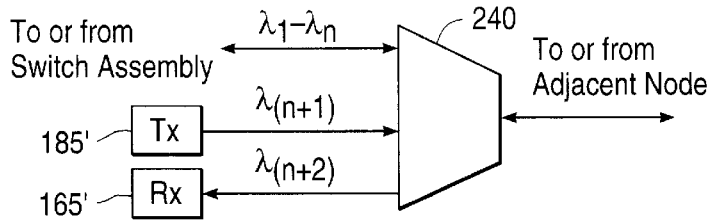
FIGS. 17A and 17B show implementations of bidirectional supervisory channels.
Figure 17B:
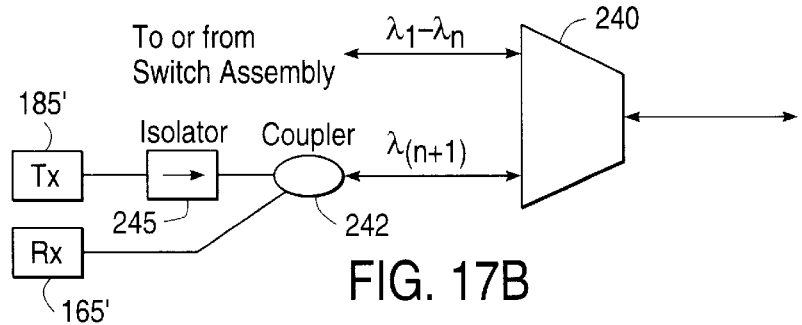

FIGS. 17A and 17B show two implementation options for realizing bidirectional supervisory channel message transmission. These are fragmentary views corresponding to portions of FIG. 13. For a given network fiber (incoming or outgoing with respect to the OSN), the single receiver (165 in FIG. 13) for an incoming fiber or the single transmitter (185 in FIG. 13) for an outgoing fiber is replaced by a receiver 165' and a transmitter 185'.

FIG. 17A shows an implementation where the incoming and outgoing supervisory messages are on two different wavelength channels, which are removed from the wavelength channel or channels dedicated to the network data. A bidirectional WDM coupler 240 serves both as a multiplexer and demultiplexer for the supervisory wavelength channels. FIG. 17B shows an implementation where the incoming and outgoing supervisory messages are on the same wavelength channel. Separation is achieved using a broadband optical coupler 242 and an isolator 245. In both these views, the network data is shown as being on wavelength channels numbered 1 to n, but this discussion applies equally to single-wavelength and multi-wavelength data links (i.e., n could be 1).

Figure 18:
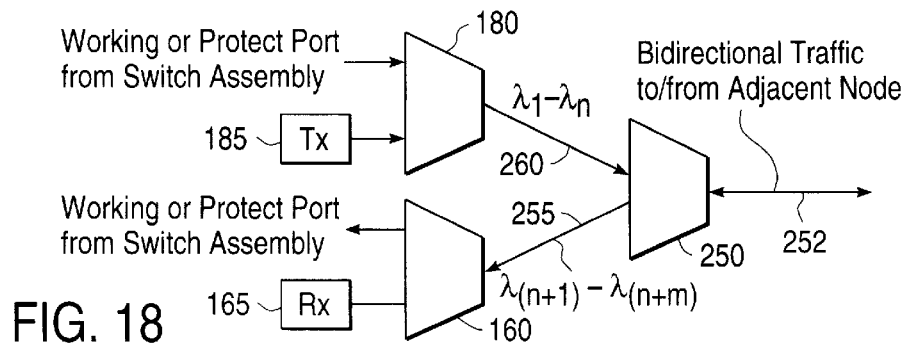
FIG. 18 shows an implementation of bidirectional WDM network data transmission.

FIG. 18 shows bidirectional WDM transmission on one of the network fibers. As alluded to above, while the specific embodiments used separate fibers for each direction, it is possible to provide communication in both directions on a single fiber for the network traffic. This is true for single-wavelength or multi-wavelength network data transmission in each direction. As in the case of the bidirectional supervisory channels shown in FIG. 17A and 17B, bidirectional WDM transmission can be implemented using a bidirectional WDM coupler 250. The figure also shows the supervisory channel devices shown in FIG. 13, namely demultiplexer 160, receiver 165, multiplexer 180 and transmitter 185.

Bidirectional operation allows inbound and outbound working or protection traffic to be multiplexed onto one fiber using separate wavelength bands. Specifically, WDM coupler 250 operates as a demultiplexer to direct incoming optical signals on a network fiber 252 onto a fiber 255 while multiplexing outgoing optical signals on a fiber 260 onto network fiber 252. For generality, the figure shows n outgoing wavelength channels and m incoming wavelength channels, but either or both of m and n could be 1.

4.3 Other Terminal Equipment

Figure 19A:
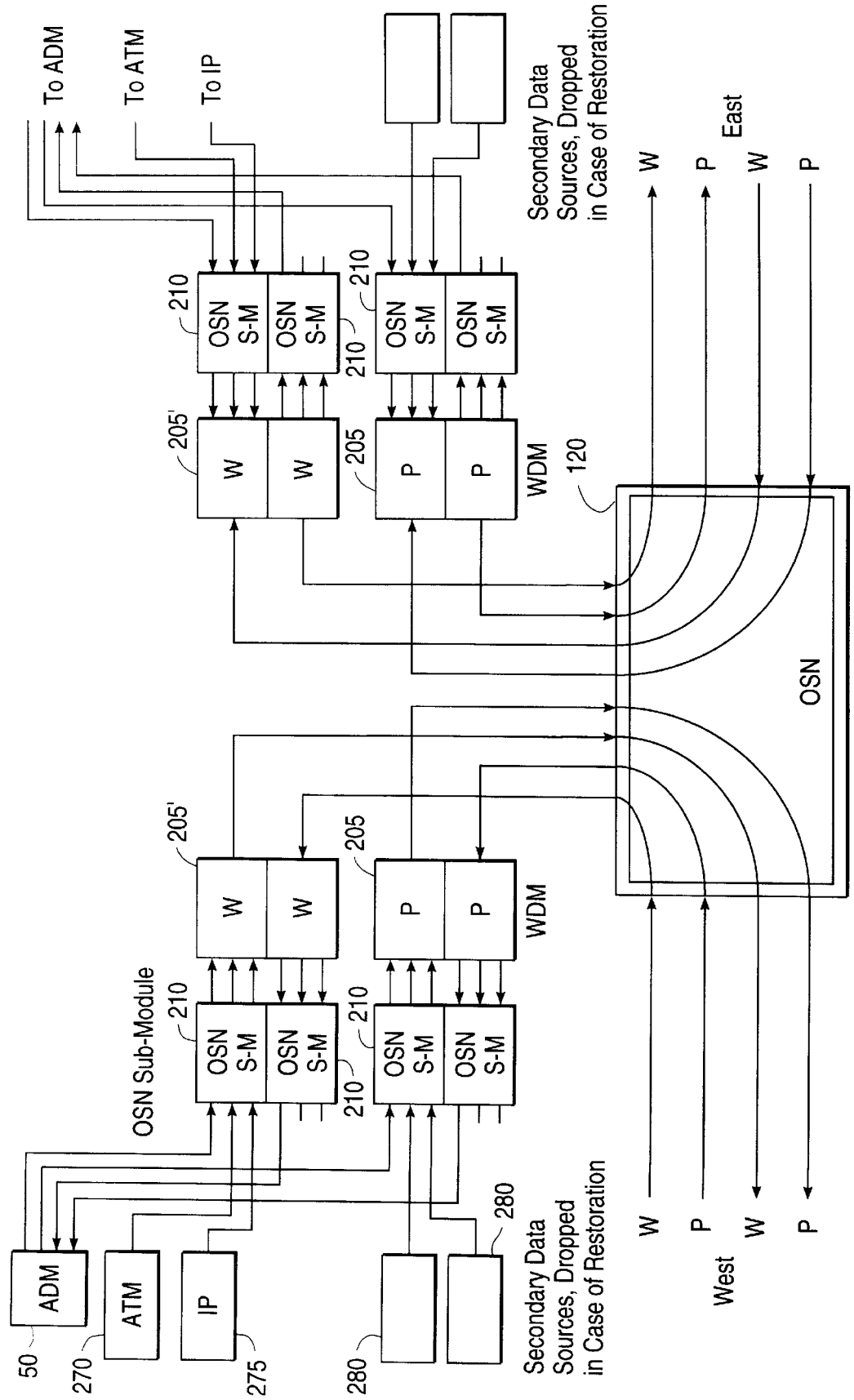
FIGS. 19A–19C show the OSN deployed in networks having mixed types of terminal equipment.
Figure 19B:
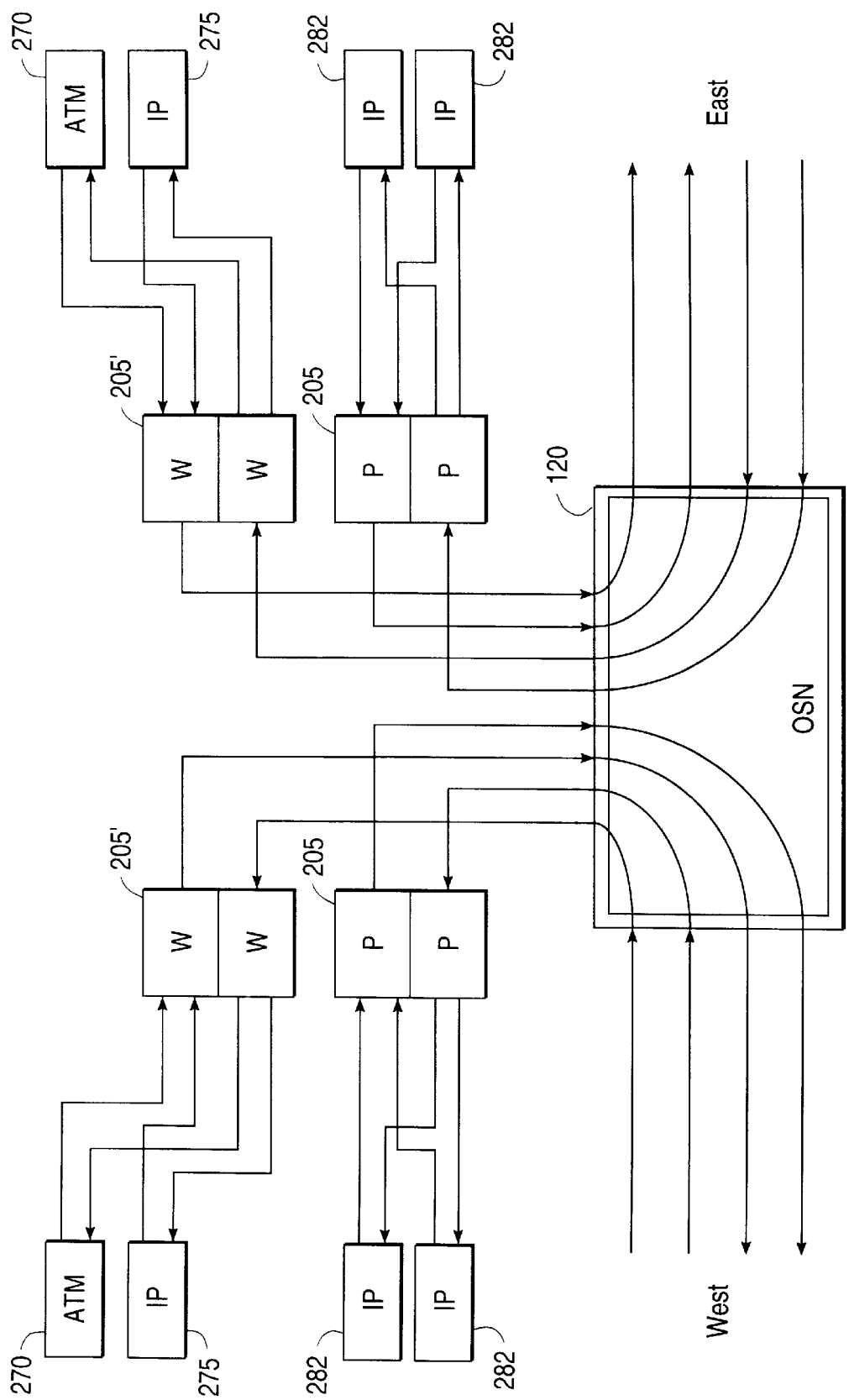
Figure 19C:
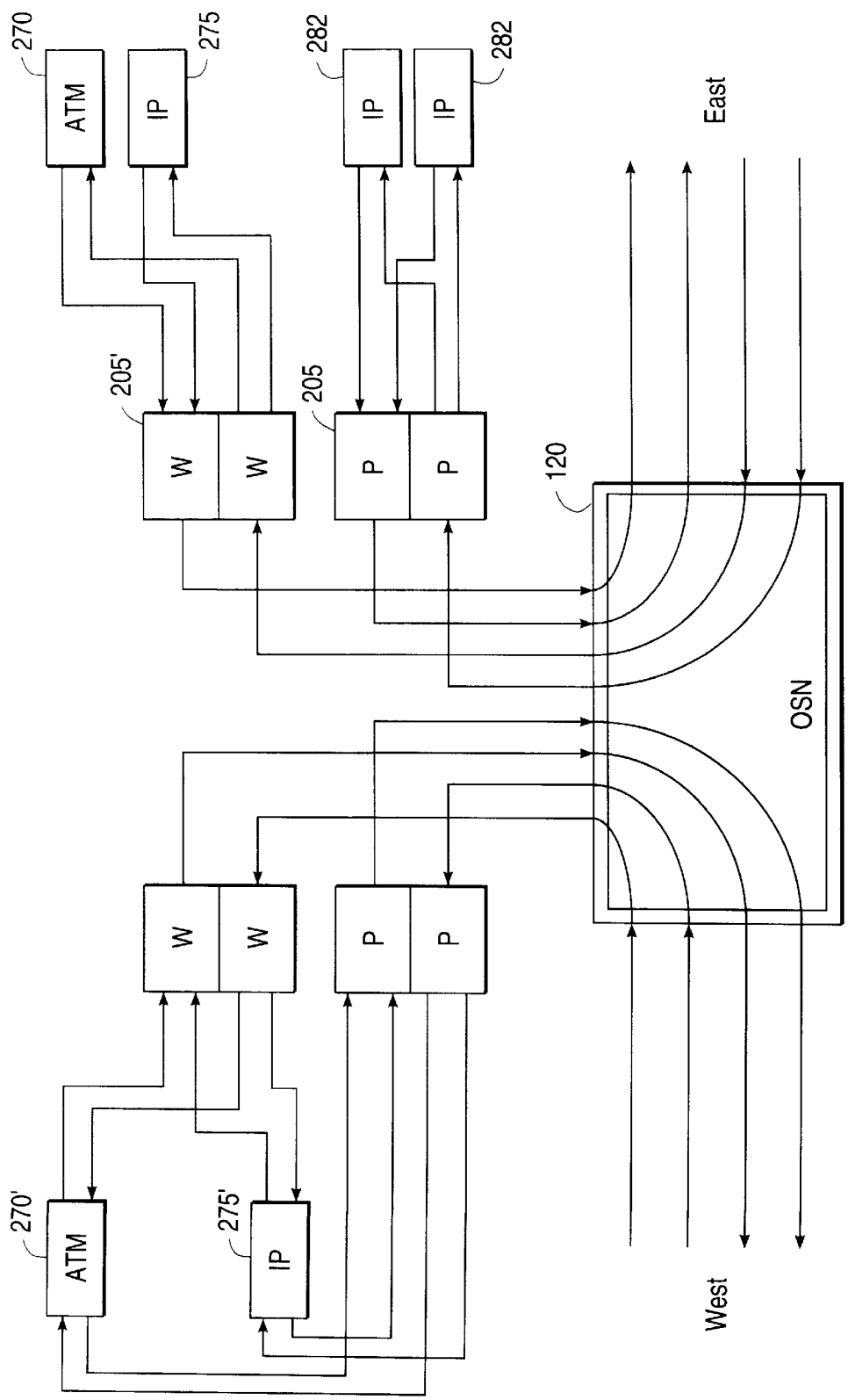

FIGS. 19A–19C show OSN 120 deployed in networks having other types of terminal equipment such as ATM and IP. Reference numbers corresponding to those in FIG. 16A will be used where appropriate.

FIG. 19A shows OSN 120 coupled to ADM 50 as well as an ATM switch 270 and an IP switch or router 275 through protection WDM terminals 205 and working WDM terminals 205" and OSN sub-modules 210. The figure also shows secondary data equipment 280 (typically IP) coupled to the OSN through the OSN sub-modules and the protection WDM terminal.

The OSN sub-modules shown in the figure can serve several functions. For simplicity, the bypass path is not shown, but the OSN sub-modules in the protection paths can be switched to cause protection WDM terminals 205 to act as regenerators for transit states of the OSN as described above in connection with FIGS. 16A–16C. In the normal state of these OSN sub-modules, as shown, the protection channels are coupled to the secondary data equipment so that the protection fibers on the network can be used during times when they are not needed for restoration. The OSN sub-modules in the working paths are not needed, but may be deployed to provide additional versatility. It should be understood that the secondary data equipment would not have access to the network during restoration.

FIG. 19B shows an OSN at a node where there are no SONET ADMs, but rather only ATM equipment 270 and IP equipment 275 coupled to the network working links through working WDM terminals 205' and the OSN. Also shown are secondary IP equipment 282 coupled to the network protection links through protection WDM terminals 205 and the OSN.

FIG. 19C shows a variant of the configuration in FIG. 19B where the ATM and IP equipment on the west side have secondary data ports coupled through the protection WDM terminal and OSN to the west side network link in the manner that secondary data equipment and 280 in FIG. 19A, secondary IP equipment 282 in FIG. 19B, and secondary IP equipment coupled to the east side in FIG. 19C.

5.0 Conclusion

In conclusion it can be seen that the present invention provides powerful and elegant techniques for providing enhanced restoration in optical fiber networks. Full protection of multi-wavelength links in a hybrid network is achieved without having to provide WDM terminal equipment at nodes between single-wavelength links in the network. Desired switching can be effected using relatively simple and inexpensive optical switching nodes, typically using only a small number of n×1 and 1×n switches where n is less than the number of inputs and outputs of the node.

While the above is a complete description of specific embodiments of the invention, various modifications, alternative constructions, and equivalents may be used. For example, FIG. 13 shows the OSN and its control electronics as being responsible for implementing the supervisory channel by generating and monitoring messages from adjacent nodes. It is possible, however, to have the terminal equipment implement the supervisory channel for controlling the OSN. Since WDM terminal systems monitor the signals on a link, a WDM-terminal controlled version of the OSN can also be implemented. Such an OSN would be completely controlled by the WDM terminals, which would determine the need for span switching or ring switching through the use of the WDM supervisory channel and other monitoring features. The physical configuration of the OSN would be similar to the particular implementation described above. The WDM terminal control system (Element Manager) would be required to send the required control signals (to set the OSN in one of the valid states for restoration). Such a configuration would have lower loss (since WDM couplers for the supervisory channel would not be required) and lower complexity since less processor capability would be required.

Therefore, the above description should not be taken as limiting the scope of the invention as defined by the claims.

What is claimed is:

1. A heterogeneous ring network having adjacent nodes linked by optical working links, with at least one multi-wavelength working link between first and second adjacent nodes, which first and second nodes are capable of sending and receiving multi-wavelength signals on the multi-wavelength working link, the network having at least one additional node, the network having at least one working link not capable of multi-wavelength operation, the network comprising:

multi-wavelength optical protection links between adjacent pairs of nodes; and an optical switching assembly at each node, the optical switching assembly having at least one optical switching element to provide a bypass path wherein light traveling along one of the node's connected protection links enters the node and is communicated to the other of the node's connected protection links without being directed to terminal equipment associated with the node;

the switching assembly also permitting a state where the associated terminal equipment is coupled to at least one of the node's connected protection links;

wherein the multi-wavelength protection links provide an alternative path between adjacent pairs of nodes in the event that the working and protection links between the first and second nodes become incapable of supporting multi-wavelength communication between the first and second nodes, notwithstanding the fact that at least some of the nodes in the network are not capable of sending and receiving multi-wavelength signals on their connected working and protection links.

2. The network of claim 1 wherein at least one of said working links includes first and second fibers, each carrying signals in only one direction.

3. The network of claim 1 wherein at least one of said protection links includes first and second fibers, each carrying signals in only one direction.

4. The network of claim 1 wherein the multi-wavelength working link includes first and second fibers, each carrying multi-wavelength signals in only one direction.

5. The network of claim 1 wherein at least one of said working links includes a single fiber carrying signals in both directions.

6. The network of claim 1 wherein the multi-wavelength working link includes a single fiber carrying multi-wavelength signals in both directions.

7. An optical network comprising, a plurality of N nodes where N>2, each given node including an optical network interface for coupling to two other nodes in the network and a terminal interface for coupling to terminal equipment associated with the given node, and a plurality of N bidirectional optical links connecting the plurality of N nodes in a ring topology to provide bidirectional communication between adjacent pairs of nodes on the network, each adjacent pair of nodes being connected by an intervening one of the optical links, the ring being considered to define two opposite directions arbitrarily designated upstream and downstream so that each node has upstream and downstream adjacent nodes, wherein:

each optical link has a bidirectional working link and a bidirectional protection link;

each node's network interface includes a first working port, a second working port, a first protection port, and a second protection port;

each node's first working and protection ports are coupled to the node's upstream adjacent node's second working and protection ports, respectively;

at least the first working link is configured for multi-wavelength operation; the first and second nodes have terminal interfaces providing wavelength division multiplexing capability to support multi-wavelength operation on the first working link;

all the protection links are configured for multi-wavelength operation;

each node includes at least one optical switching element to selectively couple that node's first and second protection ports to a bypass path that bypasses that node's terminal interface, thereby allowing multi-wavelength communication between the first and second nodes over the protection links other than the first protection link in the event that the first working and protection links become incapable of supporting multi-wavelength communication between the first and second nodes; and each node includes control electronics operating to (a) generate messages for output on that node's optical network interface, (b) process incoming messages received at that node's optical network interface, and (c) control that node's at least one optical switching element based on the messages received and the messages expected but not received.

8. The network of claim 7 wherein at least one of the bypass paths includes a regenerator.

9. The network of claim 7 wherein at least one of the protection links includes an amplifier.

10. An optical switching node for use at nodes in an optical network, the network including terminal equipment connected by network links, the optical switching node comprising:

first and second sets of bidirectional working and protection network ports for coupling to respective first and second bidirectional network links;

first and second sets of bidirectional working and protection terminal equipment ports for coupling to first and second portions of terminal equipment, each set of terminal equipment for sending and receiving data to and from said first and second bidirectional network links;

a set of switch elements connected to said sets of network and terminal equipment ports for establishing span and ring switching in the event of a failure in the network; and control electronics operating to (a) generate messages for output; (b) process incoming messages; and (c) control the set of switch elements based on the messages received and the messages expected but not received.

11. A network incorporating the optical switching node of claim 10, the network comprising:

a first link between a pair of nodes having terminal equipment capable of terminating a first type of communications, wherein the first type of communications is characterized by a first number of wavelength channels; and a second link coupled to a node having terminal equipment that is capable of terminating a second type of communications but incapable of terminating the first type of communications, wherein the second type of communications is characterized by a second number of wavelength channels that is smaller than the first number.

12. The optical switching node of claim 10 wherein:

the first type of communications is characterized by a first bandwidth and a first data format; and the second type of communications is characterized by a second bandwidth that is smaller than the first bandwidth or a second data format that is different from the first data format.

13. The optical switching node of claim 10 wherein the set of switch elements includes:

first 1×3 and 3×1 switches having their single terminals coupled to the first set of working terminal equipment ports;

second 1×3 and 3×1 switches having their single terminals coupled to the second set of working terminal equipment ports;

first 1×5 and 5×1 switches having their single terminals coupled to the first set of protection network ports;

second 1×5 and 5×1 switches having their single terminals coupled to the second set of protection network ports; and a set of interconnections among the switches.

14. The optical switching node of claim 10, further comprising:

wavelength multiplexing equipment coupled to the network ports for allowing messages to be communicated between the control electronics and the network.

15. The optical switching node of claim 10 wherein the control electronics includes a programmed computer.

16. An optical switching node for use at nodes in a network, the network including terminal equipment connected by network links, the network links including at least one multi-wavelength link between a pair of nodes having terminal equipment capable of terminating multi-wavelength communications, the optical switching node comprising:

first and second sets of bidirectional working and protection network ports for coupling to respective first and second bidirectional network links;

first and second sets of bidirectional working and protection terminal equipment ports for coupling to first and second portions of terminal equipment, each set of terminal equipment for sending and receiving data to and from said first and second bidirectional network links;

a set of switch elements connected to said sets of network and terminal equipment ports for establishing span and ring switching in the event of a failure in a multi-wavelength link; and control electronics operating to (a) generate messages for output on that optical switching node's optical network interface (b) process incoming messages received at that optical switching node's optical network interface and (c) control that optical switching node's set of switching elements based on the messages received and the messages expected but not received.

17. The optical switching node of claim 16, further including regenerator/amplifier ports for coupling to an external regenerator/amplifier, wherein said set of switching elements includes at least one state that directs light coming in from a respective protection network port out through one of said regenerator/amplifier ports and directs light coming in through another one of said regenerator/amplifier ports out on another respective protection network port.

* * * * *